United States Patent
Hasegawa et al.

(10) Patent No.: US 9,898,236 B2
(45) Date of Patent: Feb. 20, 2018

(54) IMAGE PROCESSING APPARATUS AND PROGRAM FOR PRINTING TEMPLATE IMAGES USING KEYWORD DATA

(71) Applicant: BROTHER KOGYO KABUSHIKI KAISHA, Nagoya-shi, Aichi-ken (JP)

(72) Inventors: Tomohiko Hasegawa, Okazaki (JP); Masaki Kondo, Toyoake (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 150 days.

(21) Appl. No.: 13/932,933

(22) Filed: Jul. 1, 2013

(65) Prior Publication Data

US 2014/0078545 A1   Mar. 20, 2014

(30) Foreign Application Priority Data

Jul. 1, 2012   (JP) .................................. 2012-148086

(51) Int. Cl.
*G06F 3/12*   (2006.01)
*G06F 17/30*   (2006.01)
(Continued)

(52) U.S. Cl.
CPC .......... *G06F 3/1243* (2013.01); *G06F 3/1205* (2013.01); *G06F 3/1288* (2013.01); *G06F 17/30* (2013.01); *G06T 11/60* (2013.01); *H04N 1/00* (2013.01); *H04N 1/00366* (2013.01); *H04N 1/00374* (2013.01); *H04N 1/21* (2013.01);
(Continued)

(58) Field of Classification Search
CPC ....................................................... H04N 1/21
See application file for complete search history.

(56) References Cited

U.S. PATENT DOCUMENTS 6,427,058 B1   7/2002   Akiba et al.
7,525,675 B2 *   4/2009   Shelton et al. .............. 358/1.13
(Continued)

FOREIGN PATENT DOCUMENTS

EP   2224722 A2   9/2010
JP   6-296225 A   10/1994
(Continued)

OTHER PUBLICATIONS

Office Action issued in related U.S. Appl. No. 13/932,881, dated Jul. 16, 2015.
(Continued)

Primary Examiner — Marivelisse Santiago Cordero
Assistant Examiner — Lennin Rodriguezgonzale
(74) Attorney, Agent, or Firm — Merchant & Gould P.C.

(57) ABSTRACT

An image processing apparatus includes a processor, and memory storing computer readable instructions, when executed by the processor, causing the apparatus to operate as: a template image data generating unit configured to generate template image data representing a template image including a body area for writing information therein, and also including a keyword area for writing information therein for specifying a keyword to be associated with target image data representing a target image including the body area having information written therein, from among plural keywords; and a template image data providing unit configured to provide the template image data to a printing unit.

8 Claims, 22 Drawing Sheets

(51) Int. Cl.
*G06T 11/60* (2006.01)
*H04N 1/00* (2006.01)
*H04N 1/21* (2006.01)

(52) U.S. Cl.
CPC .......... *G06F 17/30268* (2013.01); *H04N 2201/3222* (2013.01); *H04N 2201/3223* (2013.01); *H04N 2201/3271* (2013.01)

(56) References Cited

U.S. PATENT DOCUMENTS

| | | | |
|---|---|---|---|
| 8,203,763 | B2 | 6/2012 | Megawa et al. |
| 2005/0010859 | A1* | 1/2005 | McDonough ......... G06F 17/248 715/243 |
| 2005/0062991 | A1 | 3/2005 | Fujishige et al. |
| 2006/0117182 | A1 | 6/2006 | Wolff |
| 2007/0022370 | A1 | 1/2007 | Lagardere et al. |
| 2007/0195378 | A1 | 8/2007 | Yoshida |
| 2009/0248639 | A1 | 10/2009 | Sasaki et al. |
| 2009/0248676 | A1 | 10/2009 | Sasaki |
| 2010/0002247 | A1* | 1/2010 | Tsuchiya ........................ 358/1.9 |
| 2010/0201995 | A1 | 8/2010 | Yoshida |
| 2010/0220343 | A1 | 9/2010 | Horikawa |
| 2011/0157215 | A1* | 6/2011 | Aoyagi ................... G06F 3/147 345/593 |
| 2011/0170128 | A1* | 7/2011 | Takahashi ..................... 358/1.13 |
| 2012/0011429 | A1 | 1/2012 | Kosaka et al. |
| 2012/0170076 | A1 | 7/2012 | Ogasawara |
| 2012/0194846 | A1 | 8/2012 | Adachi |
| 2014/0002863 | A1 | 1/2014 | Hasegawa et al. |
| 2015/0319331 | A1 | 11/2015 | Hasegawa et al. |

FOREIGN PATENT DOCUMENTS

| | | |
|---|---|---|
| JP | 2004-282668 A | 10/2004 |
| JP | 2005-17923 A | 1/2005 |
| JP | 2007-13799 A | 1/2007 |
| JP | 2007-235885 A | 9/2007 |
| JP | 2009-237890 A | 10/2009 |
| JP | 2009-239617 A | 10/2009 |
| JP | 2009-282733 A | 12/2009 |
| JP | 2010-187056 A | 8/2010 |

OTHER PUBLICATIONS

Extended European Search Report issued in European Application No. 13174374.2, dated Dec. 17, 2015.
U.S. Office Action issued in related application U.S. Appl. No. 13/932,881, dated Jan. 20, 2016.
Office Action (Notice of Allowance) issued in related U.S. Appl. No. 14/719,533, dated Jul. 6, 2016.
Office Action (Notice of Allowance) issued in related U.S. Appl. No. 13/932,881, dated Oct. 12, 2016.
Japanese Office Action issued in related Japanese application No. 2012-148086, dated Mar. 8, 2016.
Japanese Office Action issued in related Japanese application No. 2012-148085, dated Feb. 9, 2016.
Japanese Office Action issued in related Japanese application No. 2012-148087, dated Feb. 9, 2016.

* cited by examiner

DIVISION

*FIG. 10B*
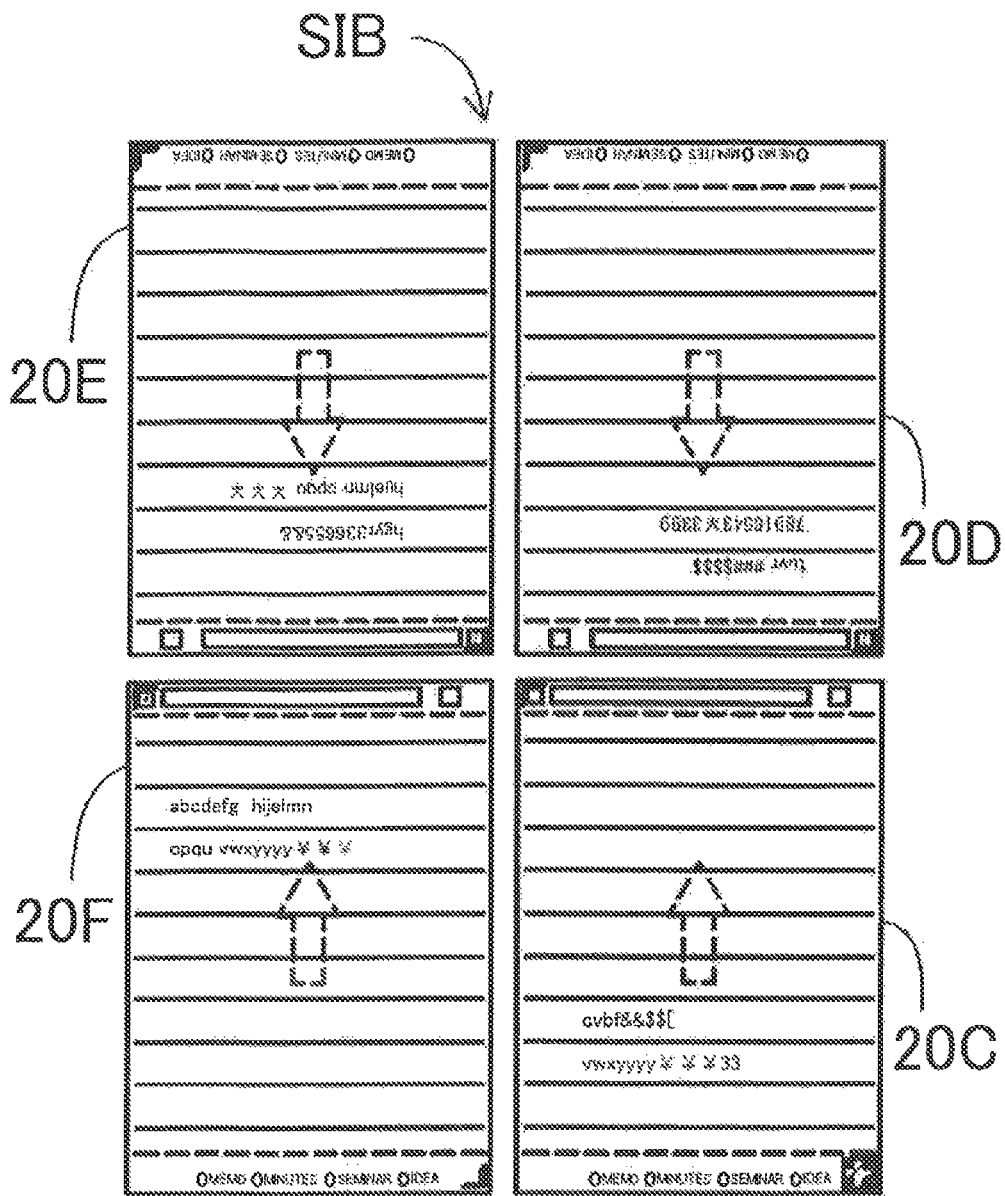
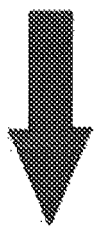
*FIG. 10C*

| DOCUMENT IMAGE NUMBER SN | DOCUMENT IMAGE PAGE NUMBER SPN | SKIP INFORMATION SK | PDF FILE NUMBER PN | PDF PAGE NUMBER PPN | ASSOCIATED KEYWORD KW |
|---|---|---|---|---|---|
| 1 | 1 | — | 1 | 1 | MINUTES |
| 1 | 2 | — | 1 | 2 | MINUTES |
| 1 | 3 | — | 1 | 3 | MINUTES |
| 1 | 4 | — | 1 | 4 | MINUTES |
| 2 | 1 | — | 1 | 5 | MINUTES |
| 2 | 2 | — | 2 | 1 | MEMO |
| 2 | 3 | — | 2 | 2 | MEMO |
| 2 | 4 | — | 3 | 1 | IDEA |
| 3 | 1 | — | 3 | 2 | IDEA |
| 3 | 2 | — | 3 | 3 | IDEA |
| 3 | 3 | — | 3 | 4 | IDEA |
| 3 | 4 | SKIP | — | — | — |

| DOCUMENT IMAGE NUMBER SN | DOCUMENT IMAGE PAGE NUMBER SPN | PDF FILE NUMBER PN | PDF PAGE NUMBER PPN | ASSOCIATED KEYWORD KW | FILE-ASSOCIATED KEYWORD FKW |
|---|---|---|---|---|---|
| 1 | 1 | 1 | 1 | MINUTES | MINUTES |
| 1 | 2 | 1 | 2 | MEMO | MEMO |
| 1 | 3 | 1 | 3 | IDEA | IDEA |
| 1 | 4 | 1 | 4 | IDEA | |
| 2 | 1 | 2 | 1 | SEMINAR,MINUTES | SEMINAR |
| 2 | 2 | 2 | 2 | MEMO | MINUTES |
| 2 | 3 | 2 | 3 | MEMO | MEMO |
| 2 | 4 | 2 | 4 | MEMO | |

MTA

IMAGE PROCESSING APPARATUS AND PROGRAM FOR PRINTING TEMPLATE IMAGES USING KEYWORD DATA

CROSS-REFERENCE TO RELATED APPLICATION

This application claims priority from Japanese Patent Application No. 2012-148086, filed on Jul. 1, 2012, the entire subject matter of which is incorporated herein by reference.

TECHNICAL FIELD

Aspects of the present invention relate to a technique of associating a keyword with image data.

BACKGROUND

As a technique for searching for desired image data from a plurality of image data, there has been proposed a management system which stores search a keyword in association with image data.

However, work for associating a keyword selected by a user with image data may deteriorate user convenience. For example, a user is required to operate a computer to input image data to the computer and additionally required to operate a computer to input a keyword. This problem is not limited to a case where a keyword is associated for search purposes, but is common to cases where a keyword is associated with image data regardless of their purposes.

SUMMARY

An aspect of the present invention provides a technique capable of improving convenience in associating a keyword with image data item.

According to an illustrative embodiment of the present invention, there is provided an image processing apparatus including: a processor; and memory storing computer readable instructions, when executed by the processor, causing the apparatus to operate as: a template image data generating unit configured to generate template image data representing a template image including a body area for writing information therein, and also including a keyword area for writing information therein for specifying a keyword to be associated with target image data representing a target image including the body area having information written therein, from among plural keywords; and a template image data providing unit configured to provide the template image data to a printing unit.

According to the above configuration, a user can write on a sheet with the template image printed thereon, to select a keyword to be associated with target image data. Therefore, it is possible to improve convenience in associating a keyword with target image data.

The present invention can be implemented in various forms such as an image processing method, an image processing apparatus, a computer program for implementing the function of the image processing method or apparatus, and a recording medium (for example, a non-transitory recording medium) having the computer program recorded thereon.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 10A to 10C are explanatory views illustrating the division document generating process;

DETAILED DESCRIPTION

A. First Illustrative Embodiment

A-1. Configuration of Document Storing System 1000

Figure 1:
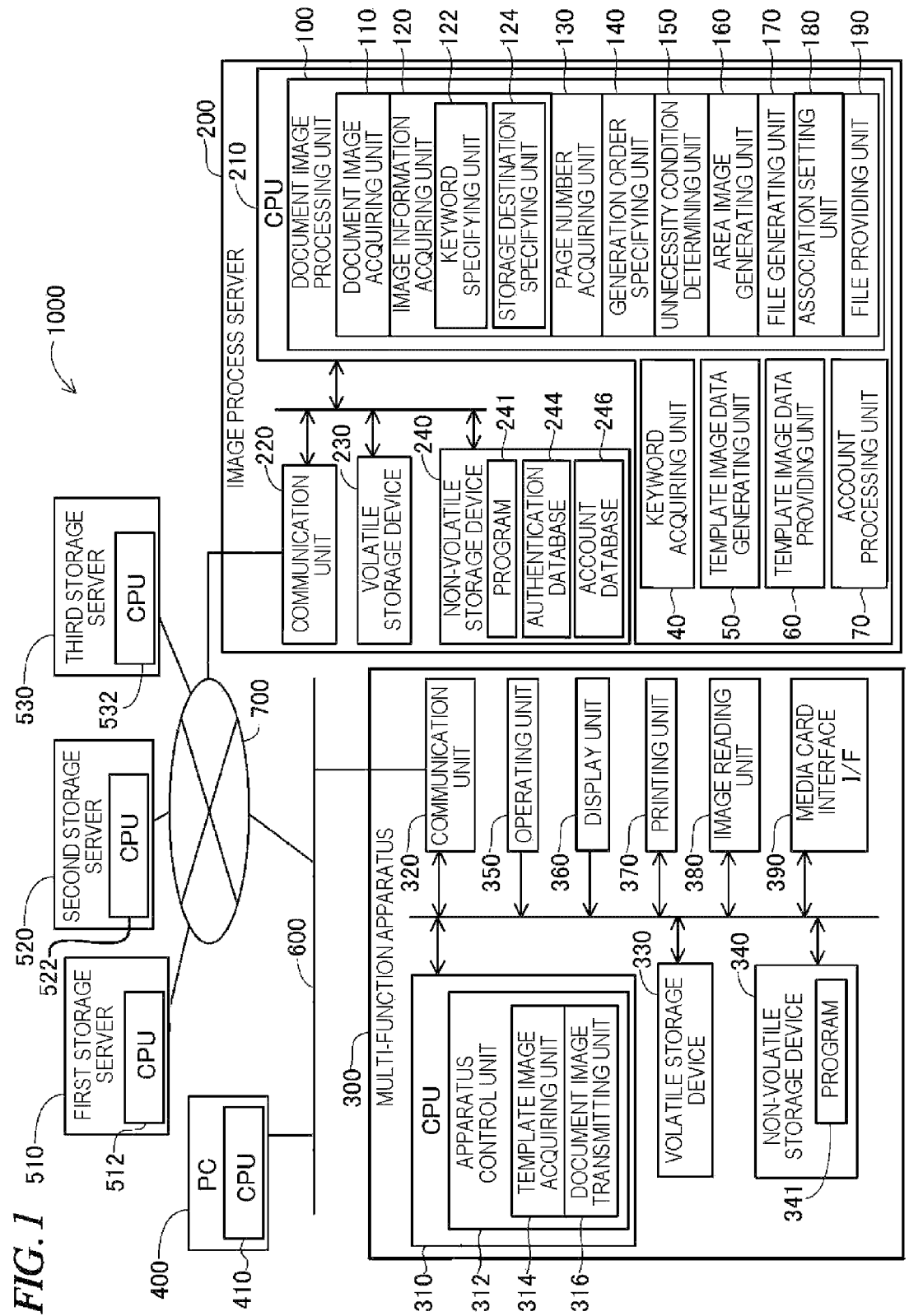
FIG. 1 is a block diagram illustrating a configuration of a document storing system 1000.

FIG. 1 is a block diagram illustrating a configuration of a document storing system 1000. The document storing system 1000 includes an image process server 200, a multi-function apparatus 300, a personal computer 400, and storage servers 510, 520, and 530. The multi-function apparatus 300 and the personal computer 400 are used by the same user, and are connected to each other through a LAN 600 to be communicable with each other. The multi-function apparatus 300 and the personal computer 400 are connected to the Internet 700 through the LAN 600. Each of the image process server 200 and the storage servers 510, 520, and 530 is connected to the Internet 700.

The multi-function apparatus 300 includes a CPU 310 for controlling the entire multi-function apparatus 300, a volatile storage device 330 such as a RAM, a non-volatile storage device 340 such as a flash memory, a communication unit 320 for connection with an external device (such as a device which is connected to the multi-function apparatus 300 through a network, or an external storage device such as a USB memory), an operating unit 350 including various buttons, a display unit 360 such as a liquid crystal panel, a printing unit 370 which is an ink jet or laser printer engine, an image reading unit 380, and a media card interface 390 which is an interface for inserting or pulling a portable storage device.

The image reading unit 380 is a scanner which uses a one-dimensional image sensor having a structure having plural photoelectric conversion elements such as CCDs or CMOSs lined up in row to optically read a document to generate document image data (also referred to as scan data or original image data). The image reading unit 380 can include, for example, an automatic document feeder to sequentially read plural sheets of document to automatically generate plural document image data.

The non-volatile storage device 340 stores a computer program 341. The computer program 341 can be recorded on a CD-ROM or the like to be provided. The CPU 310 executes the program 341 to function as an apparatus control unit 312 for controlling the entire multi-function apparatus 300. The apparatus control unit 312 includes a template image acquiring unit 314 (hereinafter, also referred to as a "template acquiring unit 314"), and a document image transmitting unit 316. These functional units perform processes to be described below.

The image process server 200 includes a CPU 210, a volatile storage device 230 such as a RAM, a non-volatile storage device 240 such as a hard disk, and a communication unit 220 including an interface for connection with the Internet 700. The non-volatile storage device 240 stores a computer program 241, an authentication database 244, and an account database 246. The computer program 241 can be recorded on a CD-ROM or the like to be provided.

The CPU 210 executes the computer program 241 to function as a keyword acquiring unit 40, a template image data generating unit 50 (also referred to as a "template image generating unit 50" or a "template generating unit 50"), a template image data providing unit 60 (also referred to as a "template providing unit 60"), an account processing unit 70, and a document image processing unit 100. The document image processing unit 100 includes a document image acquiring unit 110, an image information acquiring unit 120, a page number acquiring unit 130, a generation order specifying unit 140, an unnecessity condition determining unit 150, an area image generating unit 160, a file generating unit 170, an association setting unit 180, and a file providing unit 190. The image information acquiring unit 120 includes a keyword specifying unit 122 and a storage destination specifying unit 124. These functional units perform processes to be described below.

The first storage server 510 is a general computer, and includes a CPU 512 which executes a server program (not shown) to provide a service to store or save user's data. Specifically, a user can store document image data representing a document, in the storage server 500 through the multi-function apparatus 300 and the image process server 200 as will be described below. Similarly to the first storage server 510, the second storage server 520 (a CPU 522) and the third storage server 530 (a CPU 532) are general computers for providing services to store or save data.

The personal computer 400 includes a CPU 410 which executes a corresponding program to function as a driver (not shown) for controlling the multi-function apparatus 300, or a client to access the image process server 200. The user can use the personal computer 400 to access to document image data stored in the storage servers 510, 520, and 530.

A-2. Operation of Document Storing System 1000

The operation of the document storing system 1000 will be described with a focus on a process which the image process server 200 performs.

A-2-1: Template Image Data Generating Process

Figure 2:
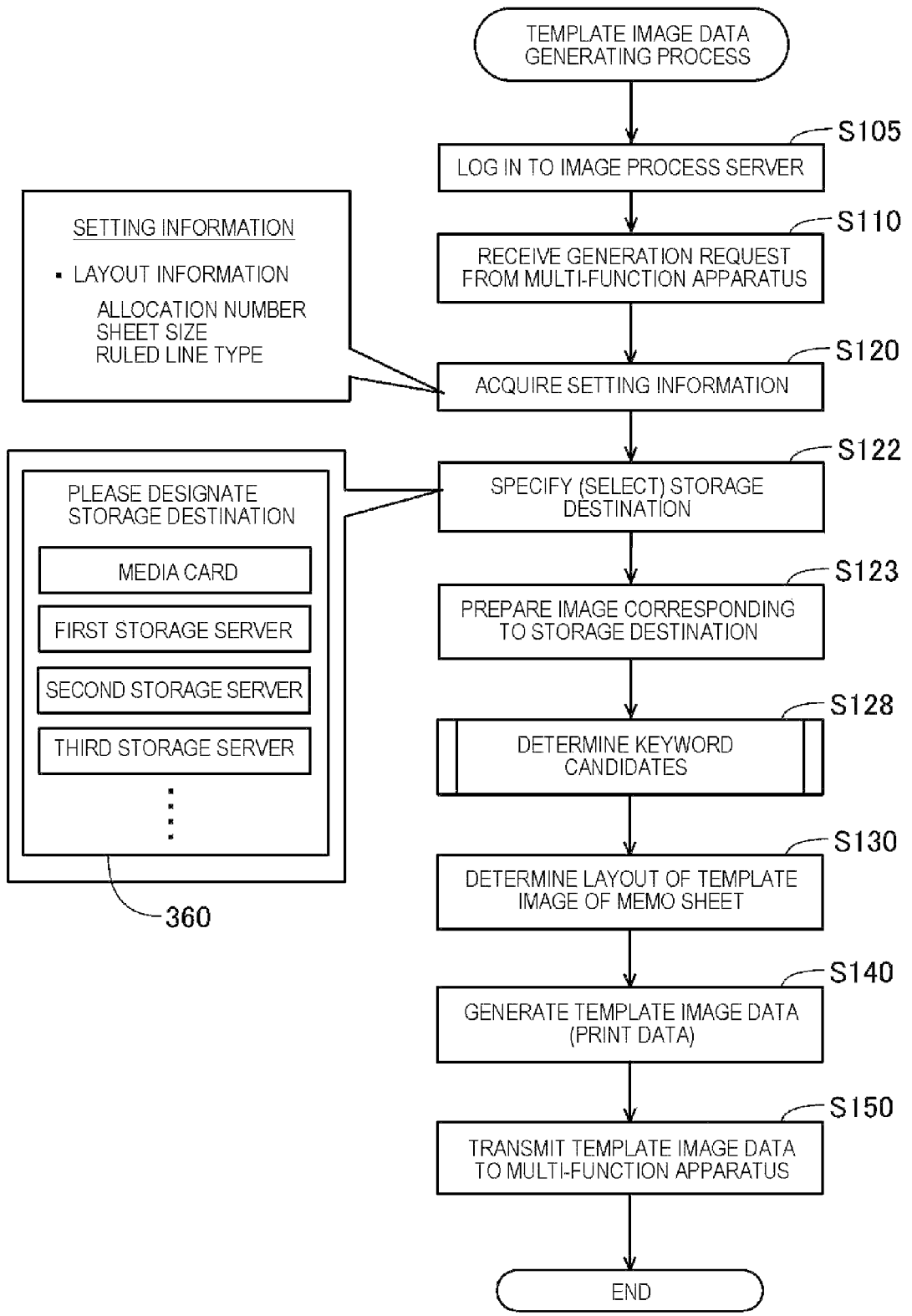
FIG. 2 is a flow chart illustrating a template image data generating process.

FIG. 2 is a flow chart illustrating a template image data generating process. The template image data generating process is a process of generating template image data for generating a memo sheet. If the image process server 200 receives a generation request to request generation of template image data, the template image data generating process is performed by the image process server 200. According to an instruction of the user of the multi-function apparatus 300, the template image acquiring unit 314 of the multi-function apparatus 300 transmits the generation request to the image process server 200. For example, the user's instruction is a print instruction to cause the printing unit 370 of the multi-function apparatus 300 to print a template image of a memo sheet.

First, in Step S105, the multi-function apparatus 300 logs in to the image process server 200. The image process server 200 manages various information for each account, as will be described below. The multi-function apparatus 300 can designate an account to log in to require the image process server 200 to perform a process based on information associated with the designated account (for example, to generate template image data). For example, the template image acquiring unit 314 of the multi-function apparatus 300 transmits an account name (an account identifier) and a password to the image process server 200. The account database 246 of the image process server 200 stores an appropriate combination of an account name and a password. If the account name and the password received have been registered in the account database 246, the account processing unit 70 of the image process server 200 accepts the login. Also, the template image acquiring unit 314 uses an account name and a password pre-associated with the multi-function apparatus 300. Alternatively, the template image acquiring unit 314 may use an account name and a password determined on the basis of information input through the operating unit 350.

Next, if receiving a generation request from the multi-function apparatus 300 in Step S110, in Step S120, the template image generating unit 50 acquires setting information included in the received generation request. As shown in FIG. 2, the setting information includes layout information designated by the user. The layout information includes an allocation number AN, a sheet size PS, and a ruled line type LT to be described below. The sheet size PS is the size of sheet predetermined to be used for printing a template image, and is any one of general sheet sizes for printing, such as A4, A3, B5, B4, and so on. Examples of the ruled line type LT include ruled lines of writing sheet (horizontal ruled lines), ruled lines of graph sheet or manuscript sheet (square ruled lines), and so on. All or part of the layout information may be predetermined and fixed values. The setting information may include other information in addition to the layout information.

Next, in Step S122, the template generating unit 50 selects (specifies) one storage destination of target image data from plural candidates according to an instruction of the user. The target image data is image data which is obtained using document image data (original image data) generated by the image reading unit 380 (which will be described in detail). As a method of acquiring an instruction of the user, arbitrary methods can be used. For example, the template generating unit 50 transmits information representing plural storage destination candidates (candidate information) to the multi-function apparatus 300. The template image acquiring unit 314 of the multi-function apparatus 300 uses the received information to display the plural storage destination candidates on the display unit 360. FIG. 2 shows an example of an image which is displayed on the display unit 360. The user can operate the operating unit 350 to select one candidate. The template acquiring unit 314 uses a signal from the operating unit 350 to specify the selected one storage destination, and transmits information representing the specified storage destination (storage destination selection information) to the image process server 200 (the template generating unit 50). Instead of acquiring the candidate information from the image process server 200, the template acquiring unit 314 may use plural predetermined candidates. The storage destination selection information may be included in the setting information.

Next, in Step S123, the template generating unit 50 prepares storage destination image data representing an image (referred to as a "storage destination image") associated with the specified storage destination. In the present illustrative embodiment, the storage destination image is a QR code (registered trademark). The storage destination image (QR code) is generated by coding a text representing the name of the storage destination such as a media card, the first storage server, or the like. Also, the template generating unit 50 acquires the storage destination image data associated with the specified storage destination, from storage destination image data prepared for each storage destination candidate. The storage destination image data of each candidate is stored in advance in the non-volatile storage device 240 (not shown). Alternatively, the template generating unit 50 may generate storage destination image data when performing Step S123.

Figure 3:
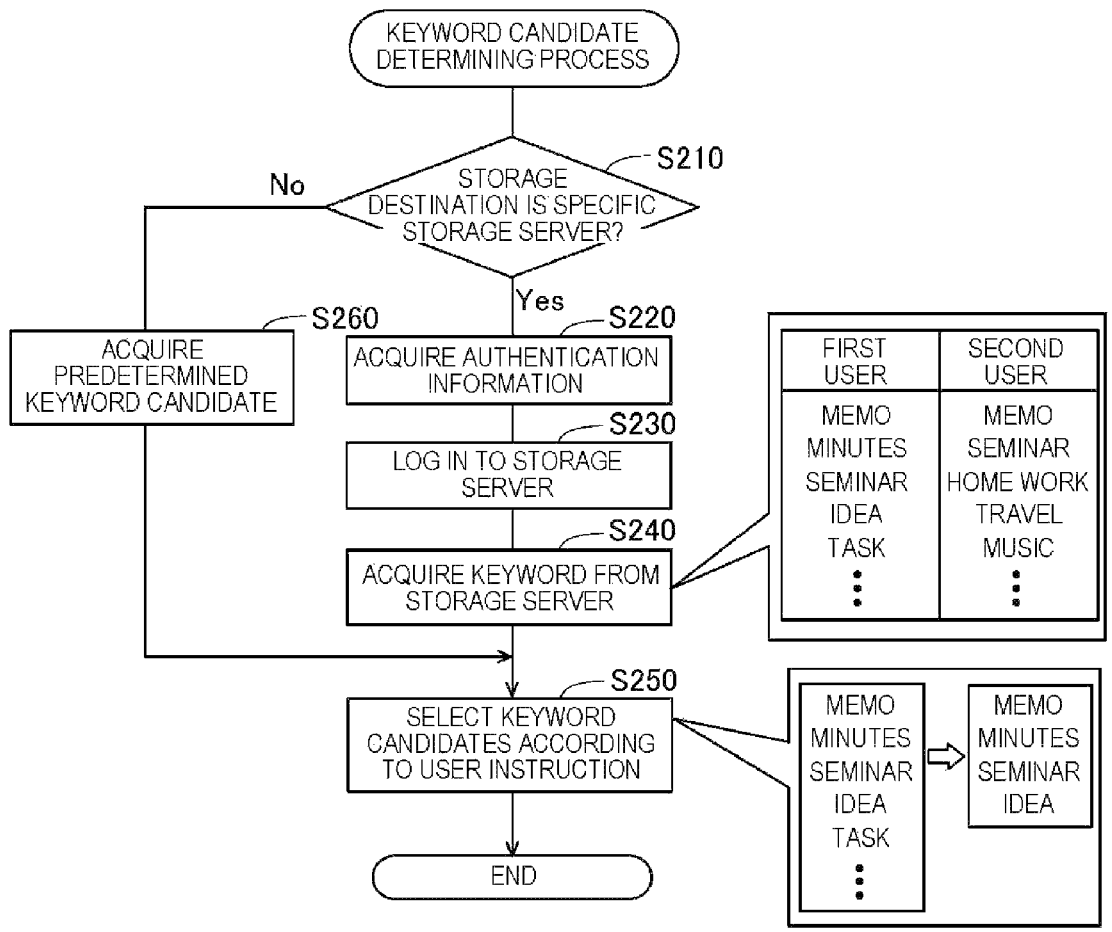
FIG. 3 is a flow chart illustrating a keyword candidate determining process.

Next, in Step S128, the keyword acquiring unit 40 determines keyword candidates. FIG. 3 is a flow chart illustrating a keyword candidate determining process. First, in Step S210, the keyword acquiring unit 40 determines whether the storage destination is a specific storage server. The "specific storage server" which is determined in Step S210 is a storage server having a function of storing a data file in association with a keyword. For example, the CPU 512 of the first storage server 510 has a function of storing data files in association with keywords, a function of using a keyword designated by the user to search for a data file, and a function of providing the search result to the user (these keywords are also called tags). Also, the CPU 522 of the second storage server 520 has a function of using keywords as folder names and storing data files in folders named by the keywords. In the present illustrative embodiment, examples of the specific storage server include the first storage server 510 and the second storage server 520.

If the storage destination is different from the specific storage server (No in Step S210), the keyword acquiring unit 40 acquires predetermined keyword candidates in Step S260, and proceeds to Step S250. The predetermined keyword candidates are incorporated in the computer program 241 in advance.

If the storage destination is the specific storage server (Yes in Step S210), in Step S220, the keyword acquiring unit 40 acquires authentication information with reference to the authentication database 244. The authentication information includes a user ID and a password necessary to log in to each storage server.

Figure 4:
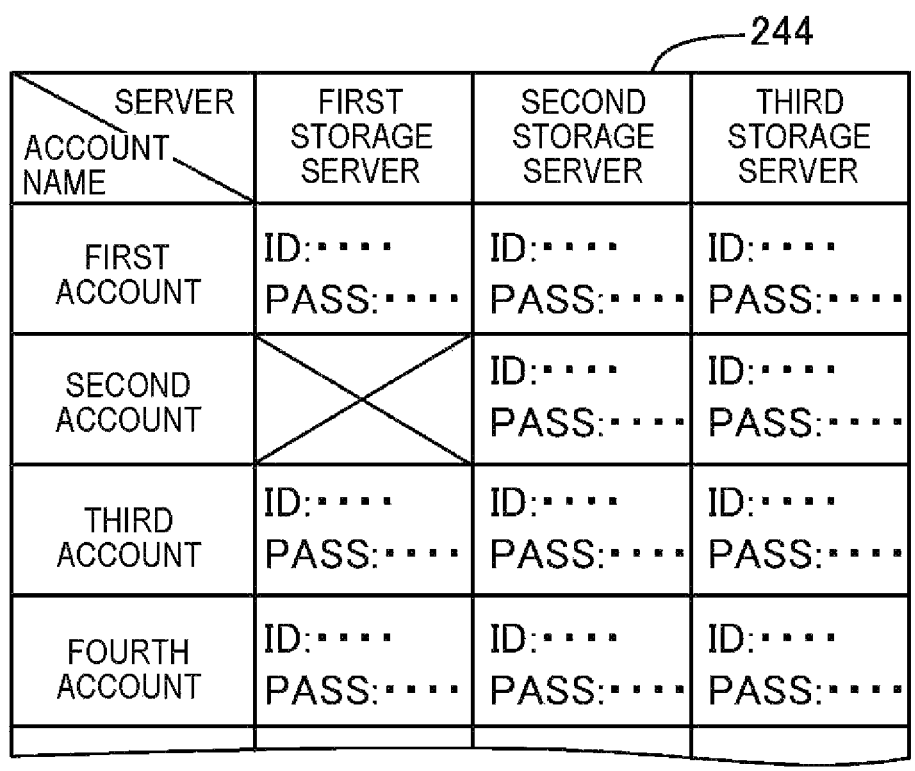
FIG. 4 is a schematic view illustrating an example of an authentication database 244.

FIG. 4 is a schematic view illustrating an example of the authentication database 244. As shown in FIG. 4, the authentication database 244 stores authentication information of each of the plural storage servers 510, 520, and 530 for each account of the image process server 200. Each authentication data is registered in advance by the user (for example, the user can register the authentication information in the image process server 200 through the multi-function apparatus 300). The keyword acquiring unit 40 acquires authentication information associated with the combination of the account and the storage destination received in Step S105 of FIG. 2, from the authentication database 244.

Next, in Step S230 of FIG. 3, the keyword acquiring unit 40 uses the authentication information acquired in Step S220, to log in to the storage server which is the storage destination. Then, in Step S240, the keyword acquiring unit 40 acquires keywords associated with user IDs, from the logged-in storage server. The acquired keywords are keywords having already registered in the storage server (for example, tags or folder names). FIG. 3 shows examples of keywords associated with a first user, and examples of keywords associated with a second user. As shown in FIG. 3, plural users can use the same keyword, or different keywords. That is, even if some keywords are commonly used, it can be said that the set of the plural keywords associated with the first user is different from the set of the plural keywords associated with the second user.

Next, in Step S250, the keyword acquiring unit 40 selects keyword candidates from the acquired one or more keywords, according to an instruction of the user. As a method of acquiring an instruction of the user, arbitrary methods can be used. For example, the keyword acquiring unit 40 transmits information representing a keyword list to the multi-function apparatus 300. The template acquiring unit 314 of the multi-function apparatus 300 uses the received information to display the keyword list on the display unit 360. The user can operate the operating unit 350 to select one or more keywords (in the present illustrative embodiment, the maximum value of the total number of selectable keywords is "4"). The template acquiring unit 314 uses a signal from the operating unit 350 to specify the selected one or more keywords, and transmits information representing the selected one or more keywords (keyword selection information) to the image process server 200 (the keyword acquiring unit 40). In response to completion of selecting the keyword candidates, the process of FIG. 3 terminates.

In Step S130 of FIG. 2, the template image generating unit 50 uses the setting information including the layout information to determine the layout of a template image and the contents of unit images 10 to be disposed in the template image. In Step S140, the template image generating unit 50 generates template image data having the unit images 10 representing the determined contents and disposed in the determined layout. The unit images 10 correspond to partial images of the template image.

Figure 5A:
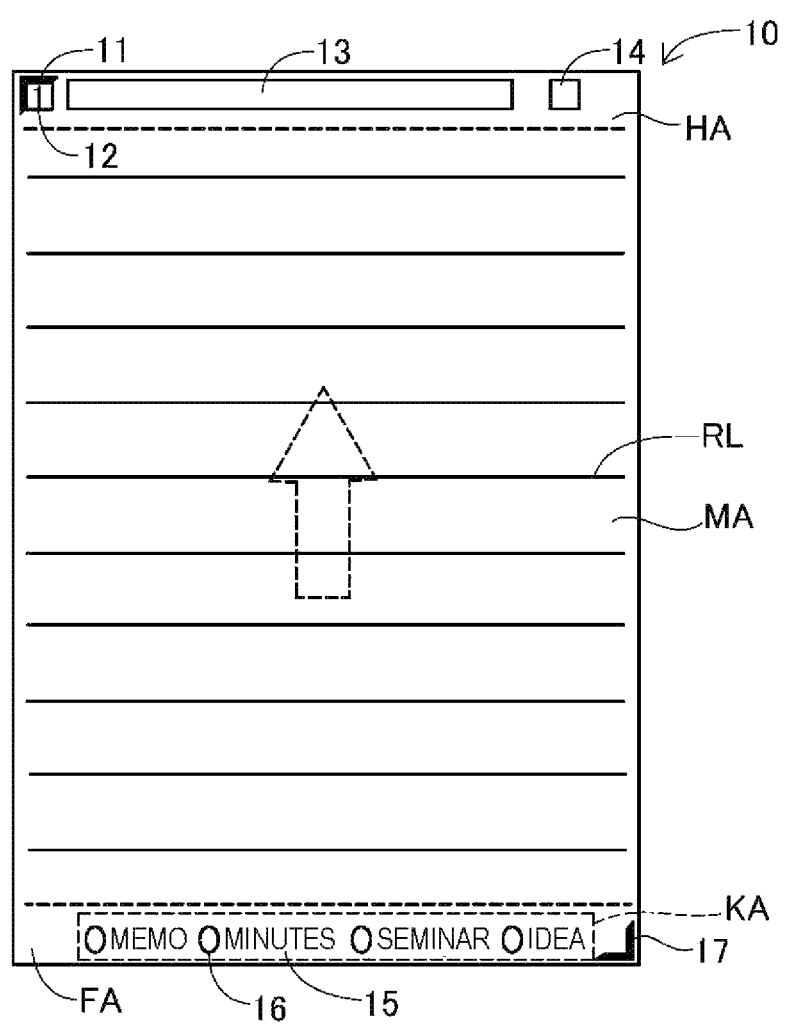
FIGS. 5A to 5C are views illustrating examples of a template image TI.
Figure 5B:
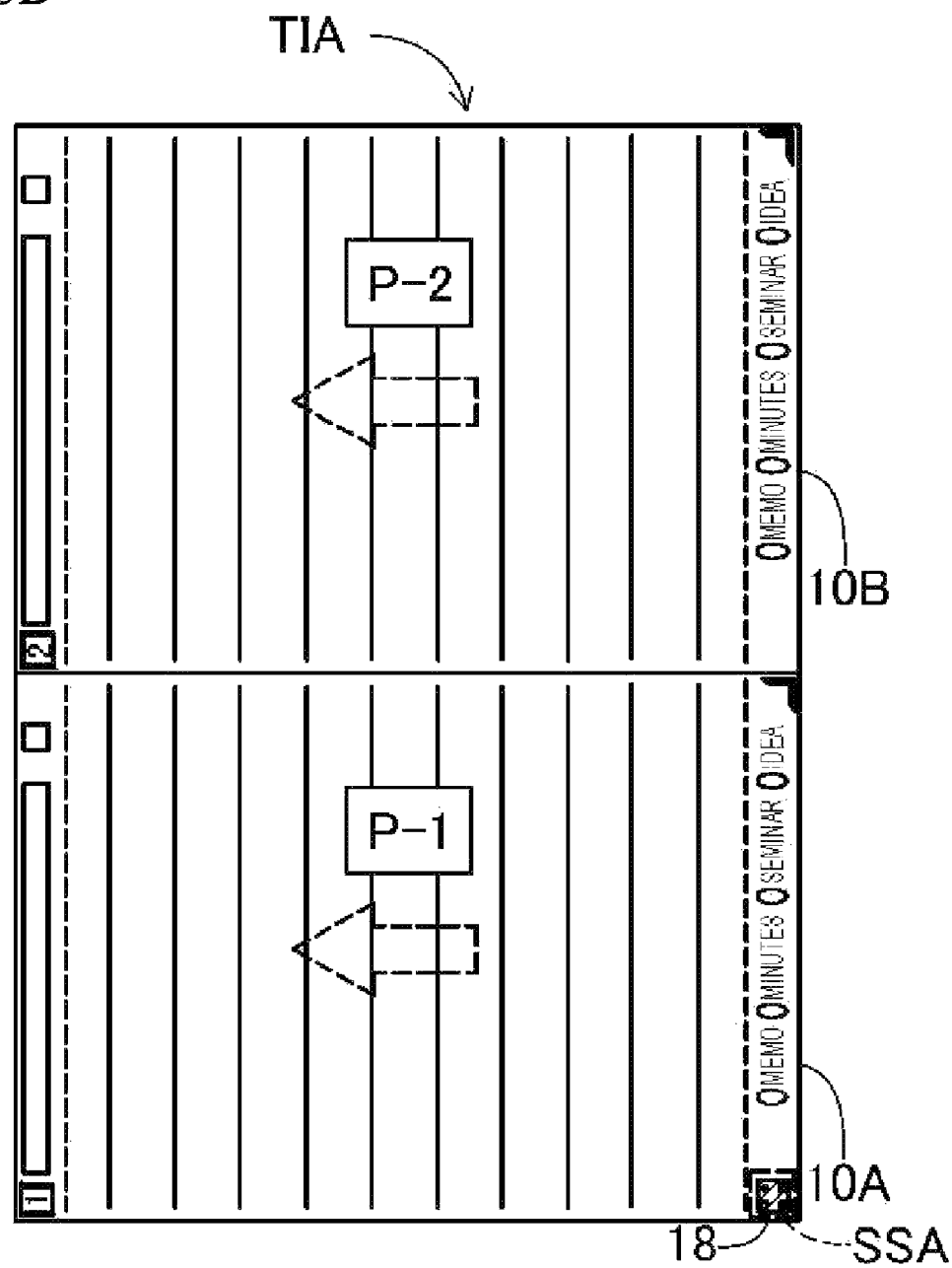
Figure 5C:
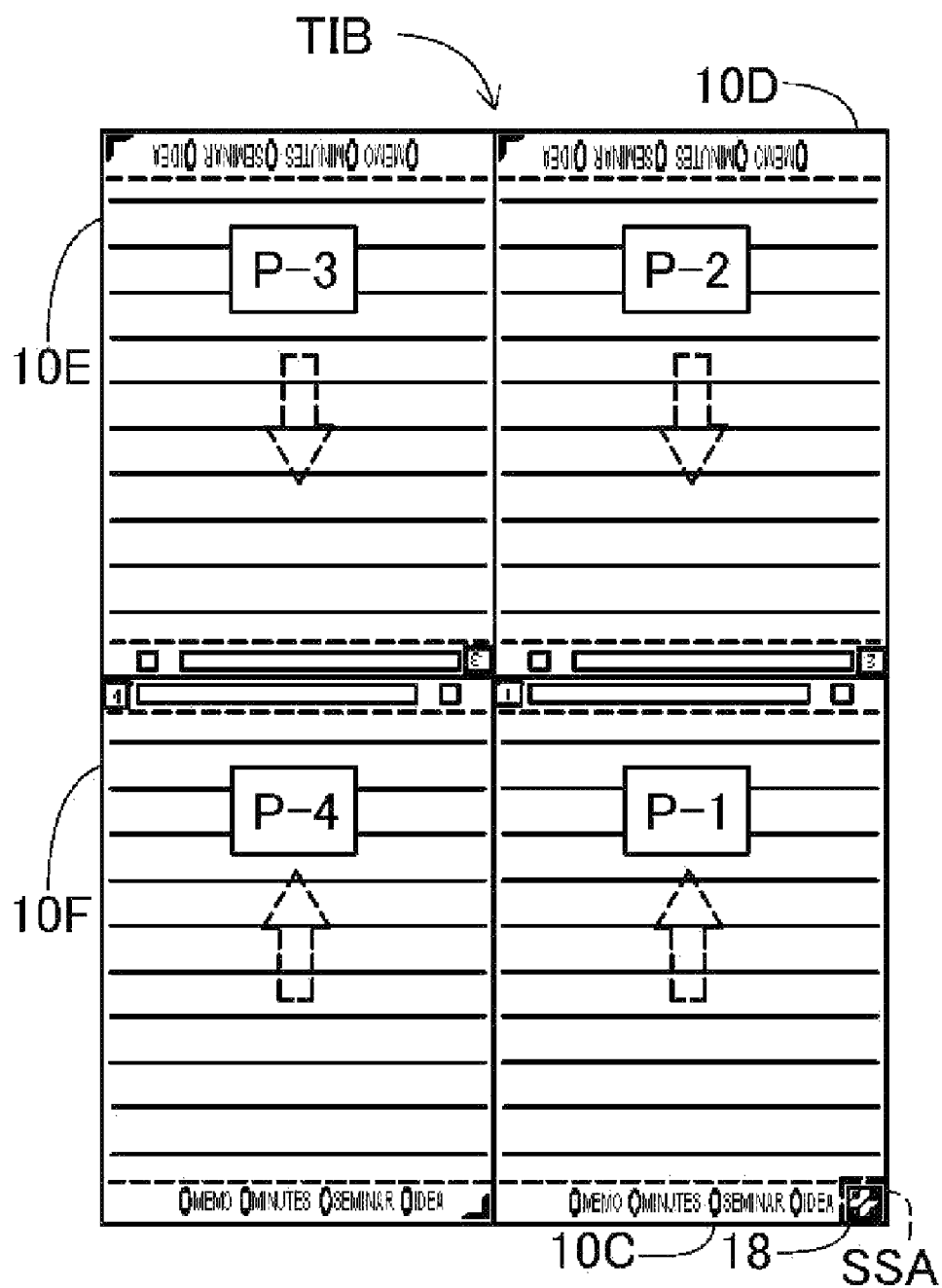
Figure 6A:
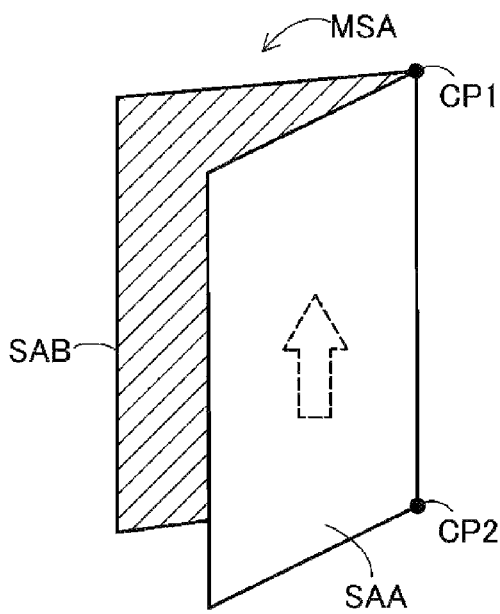
FIGS. 6A to 6C are views illustrating use modes of a memo sheet MS.
Figure 6B:
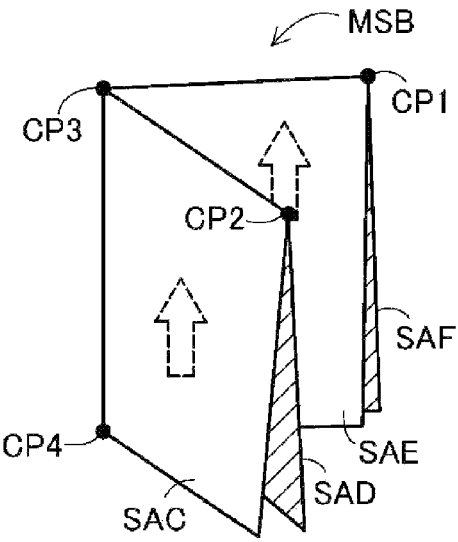

FIGS. 5A to 5C are views illustrating examples of a template image TI which is represented by template image data. FIGS. 6A to 6B are views illustrating use modes of a memo sheet MS. FIG. 5A shows an example of the unit image 10. FIG. 5B shows a first type of template image TIA having an allocation number AN of 2, and FIG. 5C shows a second type of template image TIB having an allocation number AN of 4. FIG. 6A shows a use mode of a first type of memo sheet MSA having the first type of template image TIA printed thereon, and FIG. 6B shows a use mode of a second type of memo sheet MSB having the second type of template image TIB printed thereon. Incidentally, in a case of distinguishing specific types of template images TI and memo sheets MS, alphabets (for example, 'A' or 'B') are further added to the ends of their reference symbols.

As shown in FIGS. 5B and 5C, a template image TI includes (AN-number of) unit images 10, the number of which corresponds to the allocation number AN. In other words, in a case of printing the template image TI on a sheet to generate a memo sheet MS, the allocation number AN is the number of unit images 10 to be printed on (one side of) one sheet. The first type of template image TIA includes two unit images 10A and 10B, and the second type of template image TIB includes four unit images 10C, 10D, 10E, and 10F. Incidentally, in a case of distinguishing specific unit images 10, alphabets (for example, 'A' or 'B') are further added to the ends of their reference symbols. This is similarly applied to areas SA of the memo sheets MS to be described below.

The memo sheets MS having the template images TI printed thereon are folded as shown in FIGS. 6A and 6B and are used in the folded states. Specifically, the first type of memo sheet MSA (FIG. 6A) is folded along a first folding line which is a line connecting the middle points CP1 and CP2 of two long sides of rectangular sheet, one time, and is used in the folded state. The second type of memo sheet MSB (FIG. 6B) is folded along a second folding line which is a line connecting the middle points CP3 and CP4 of two long sides of the sheet folded one time (which were short sides before the folding), one more time, and is used in the folded state. By the folding lines when the memo sheets MS have been folded, one face of each memo sheet MS is divided into plural areas SA. Specifically, one face of the first type of memo sheet MSA is divided into two areas SAA and SAB (FIG. 6A), and the second type of memo sheet MSB is divided into four areas SAC, SAD, SAE, and SAF (FIG. 6B).

It is assumed that each area SA of the memo sheet MS is used as a memo area for one page. For example, in the first type of memo sheet MSA, the area SAA is used as a memo area of a first page, and the area SAB is used as a memo area of a second page. In the second type of memo sheet MSB, the four areas SAC, SAD, SAE, and SAF are used as memo areas of first to fourth pages, respectively.

The unit images 10 are printed to each of the areas SA of the memo sheet MS, one per area. That is, one unit image 10 is configured to be convenient when used as a memo area of one page. Specifically, as shown in FIG. 5A, one unit image 10 includes a ruled line area MA which includes ruled lines RL of the type designated by the layout information, a header area HA which is adjacent to the upper side of the ruled line area MA, and a footer area FA which is adjacent to the lower side of the ruled line area MA. The ruled line area MA is also called a body area MA, and the header area HA and the footer area FA are also called peripheral areas positioned at the periphery of the ruled line area MA (the body area MA). The ruled line area MA is a substantially blank area which includes the ruled lines RL but does not include any substantial objects such as characters, figures, and drawings. Herein, the body area MA may be a plain area without ruled lines or the like.

The header area HA includes a top marker 11, a page information area 12, a title area 13, and an unnecessity check box 14. The top marker 11 may be disposed at the left corner of the header area HA (the upper left corner of the unit image 10), and have a shape including a part parallel to a horizontal direction, and a part parallel to a vertical direction (a shape obtained by rotating the character "L" 90 degrees clockwise). In the page information area 12, the page number of the unit image 10 in the template image TI is written. The title area 13 is an area for allowing the user to write a title for each unit image 10. The unnecessity check box 14 is an area for allowing the user to write a check mark in a case where it is unnecessary to store the unit image 10.

The footer area FA includes a keyword area KA and a bottom marker 17. The keyword area KA includes plural character images 15 representing plural keywords, respectively, and plural mark areas 16 corresponding to the plural character images 15 (keywords), respectively. The specific contents of the keywords (such as 'MEMO', 'MINUTES', 'SEMINAR', and 'IDEA') are determined in Step S128 of FIG. 2. The mark areas 16 are areas which the user can fill to specify all or some of the plural keywords. Keywords corresponding to filled mark areas 16 are associated with the unit image 10. The bottom marker 17 may have a shape obtained by rotating the top marker 11 180 degrees clockwise. As can be seen from the above, even if the ruled line area MA is substantially blank, in other words, even if the contents of the ruled line area MA have not been determined, keywords candidates (character images 15) to be associated can be printed onto the memo sheet MS having the template image TI printed thereon.

Each unit image 10 is disposed inside the template image TI such that it is convenient in a case of using a memo sheet MS having the template image TI printed thereon in a folded state as described with reference to FIGS. 6A and 6B.

Specifically, as shown in FIG. 5B, two unit images 10A and 10B of the first type of template image TIA are disposed in areas corresponding to the two areas SAA and SAB shown in FIG. 6A, respectively. The two unit images 10A and 10B are disposed in the same direction inside the first type of template image TIA such that an upper side (an arrow in FIG. 6A) which is assumed in a case where the first type of template image TIA is used in the folded state and the upper sides (arrows in FIG. 5B) of the two unit images 10A and 10B match with each other.

Also, as shown in FIG. 5C, the four unit images 10C to 10F of the second type of template image TIB are disposed in areas corresponding to the four areas SAC to SAF shown in FIG. 6B, respectively. Then, two unit images 10C and 10F and two unit images 10D and 10E are disposed in opposite directions to each other inside the second type of template image TIB such that an upper side (an arrow in FIG. 6B) which is assumed in a case where the second type of template image TIB is used in the folded state and the upper sides of the four unit images 10C to 10F (arrows in FIG. 5C) match with each other. In other words, the two unit images 10C and 10F and the two unit images 10D and 10E are in opposite directions to each other with a line in the second type of template image TIB corresponding to the above-mentioned first folding line and interposed between the two unit images 10C and 10F and the two unit images 10D and 10E.

In FIGS. 5B and 5C, numerals (following "P-") shown in the unit images 10 show page numbers assigned to the corresponding unit images 10 inside the template image TI. As can be seen from those numerals, the page numbers of the unit images 10 are assigned according to an order of use which is assumed in the above-mentioned folded state. As described above, each page number is shown in the page information area 12 (FIG. 5A).

Further, the template image TI includes one storage destination specifying area SSA as shown in FIGS. 5B and 5C. In FIGS. 5B and 5C, the storage destination specifying area SSA is disposed at the lower left corner the template image TI. The storage destination specifying area SSA includes a storage destination image 18 (a QR code in the present illustrative embodiment) prepared in Step S123 of FIG. 2. The destination specifying area SSA is included in one unit image 10 of plural unit images 10 in the template image TI. The QR code may include various information, which are usable in a division document generating process to be described below.

As can be appreciated from the above explanation, the sizes of unit images 10 included in one template image TI are the same. Also, in a case where the sheet size is fixed, as the allocation number AN increases, the sizes of unit images 10 decrease, and as the allocation number AN decreases, the sizes of unit images 10 increase. Specifically, in the case where the sheet size is fixed, if the allocation number AN doubles, the area of each unit image 10 becomes nearly half. Also, in a case where the allocation number AN is fixed, that is, in a case where the number of unit images 10 to be included in one template image TI is fixed, as the sheet size increases, the size of each unit image 10 increases, and as the sheet size decreases, the size of each unit image 10 decreases. Specifically, if the sheet area doubles, the area of each unit image 10 also doubles. Also, as can be appreciated from the explanation on the folded states of FIGS. 6A and 6B, in the present illustrative embodiment, the number of unit images 10 to be included in one template image TI (the allocation number AN) has the value of the Z power of 2 (here, Z is a natural number). In other words, the allocation number AN has any one of 2, 4, 8, 16, 32, . . . .

If the template image data is generated in Step S140 of FIG. 2, the template providing unit 60 transmits (provides) the template image data to the multi-function apparatus 300 in response to a generation request from the multi-function apparatus 300, in Step S150, and terminates the process. As the format of the transmitted template image data, various data formats can be used, print data subjected to a rasterizing process or a halftone process may be used, and vector data such as image data described in a page description language may also be used.

The apparatus control unit 312 of the multi-function apparatus 300 uses the received template image data to print the template image TI on a sheet to generate a memo sheet MS. The generated memo sheet MS can be used by the user.

Figure 6C:
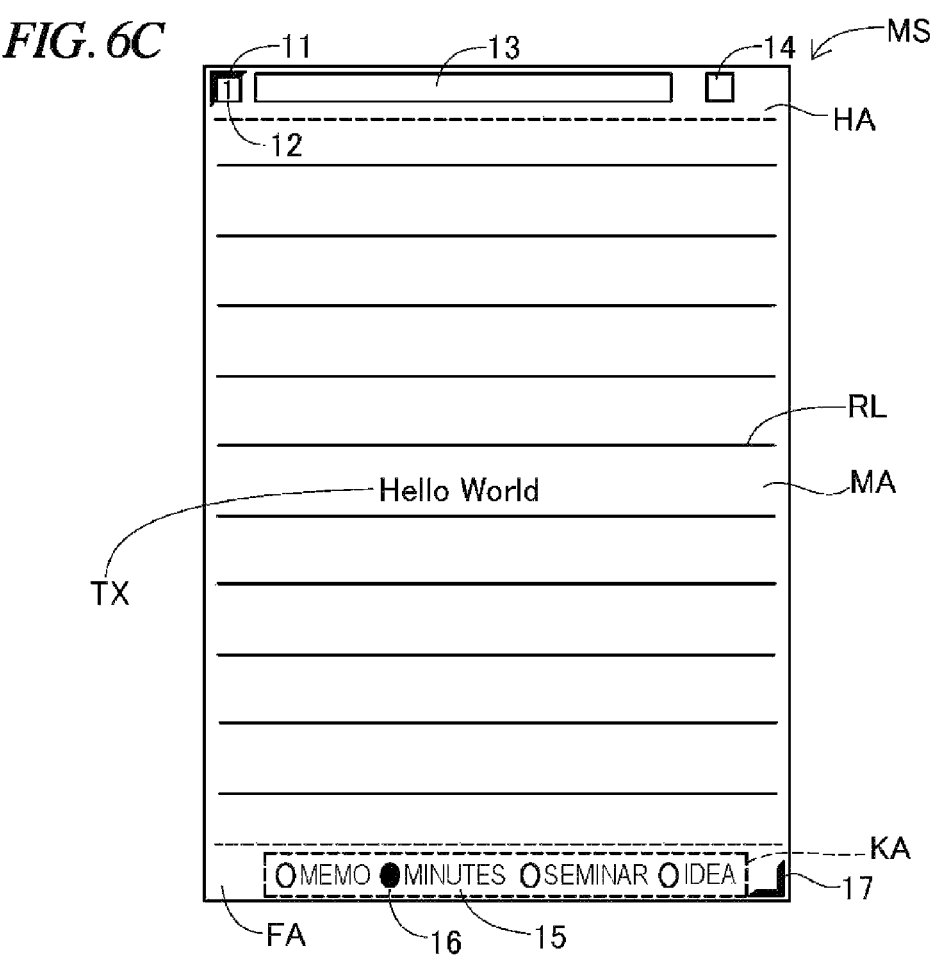

FIG. 6C is a schematic view illustrating an example of a used memo sheet MS. In FIG. 6C, a portion corresponding to one unit image 10 is shown. As shown in FIG. 6C, in the body area MA, arbitrary information (for example, characters TX) are written by the user. Also, in the keyword area KA, mark areas 16 associated with some keywords are filled. This memo sheet MS can be used as a document.

A-2-2: Division Document Generating Process

Figure 7:
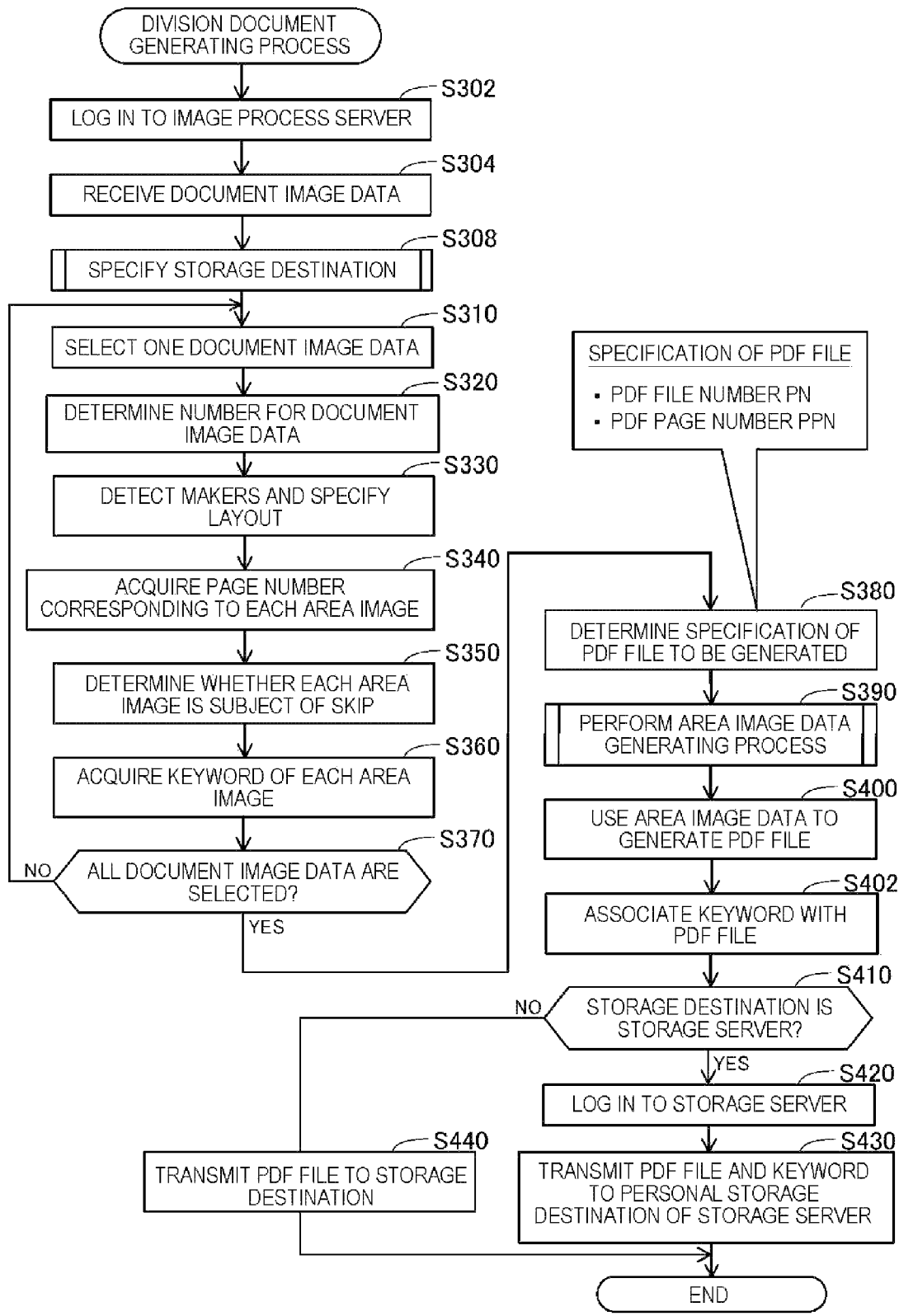
FIG. 7 is a flow chart illustrating a division document generating process.
Figure 8:
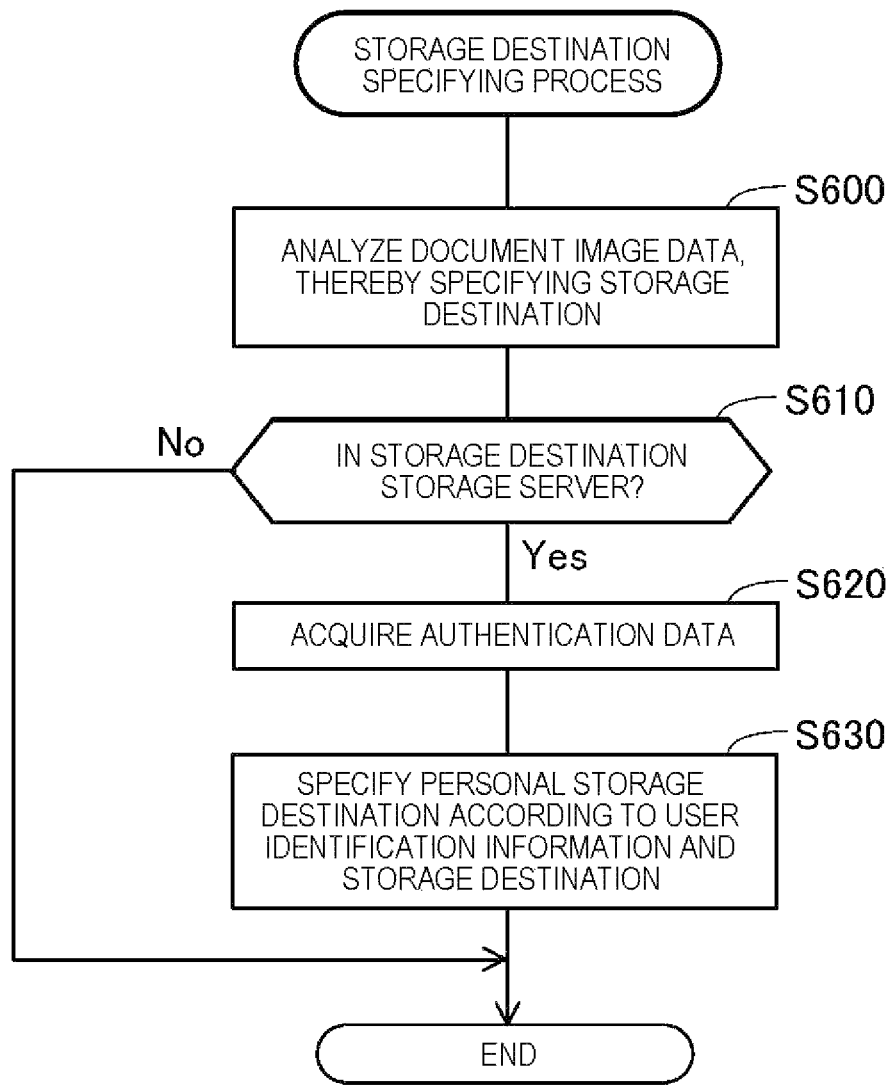
FIG. 8 is a flow chart illustrating a storage destination specifying process.

FIGS. 7 and 8 are flow charts illustrating a division document generating process. The document generating process is a process of generating a file (which is target image data and is a portable document format (PDF) file in the present illustrative embodiment) for computerizing and storing a memo sheet MS having write information written (handwritten) by the user. The document generating process is performed by the document image processing unit 100 of the image process server 200 if the image process server 200 receives document image data from the multi-function apparatus 300. The document image transmitting unit 316 generates document image data by reading the written memo sheet MS with using the image reading unit 380 of the multi-function apparatus 300. The document image transmitting unit 316 stores the generated document image data, for example, in one transmission file, which is transmitted to the image process server 200. In a case where there are plural document image data to be transmitted, the plural document image data are disposed or arranged in an order of generation (an order of read) in a transmission file. That is, plural document image data are transmitted such that the generation order specifying unit 140 of the image process server 200 can specify the order of generation of the plural document image data.

Figure 9A:
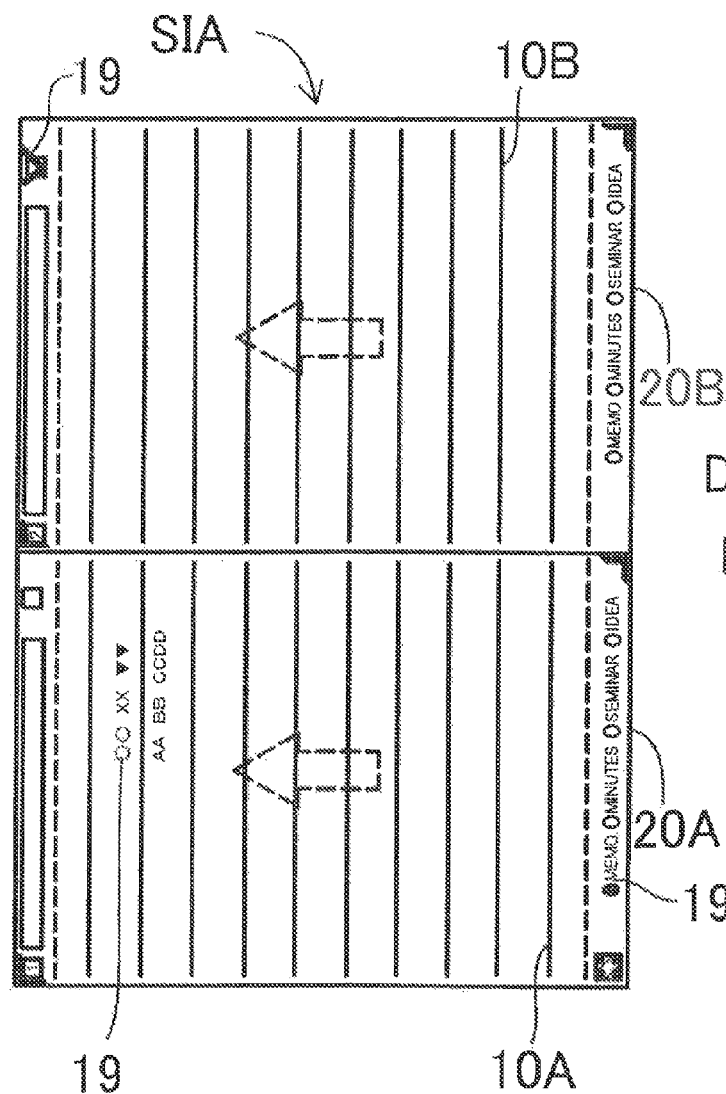
FIGS. 9A to 9C are explanatory views illustrating the division document generating process.
Figure 9B:
Figures 9B, 9C:
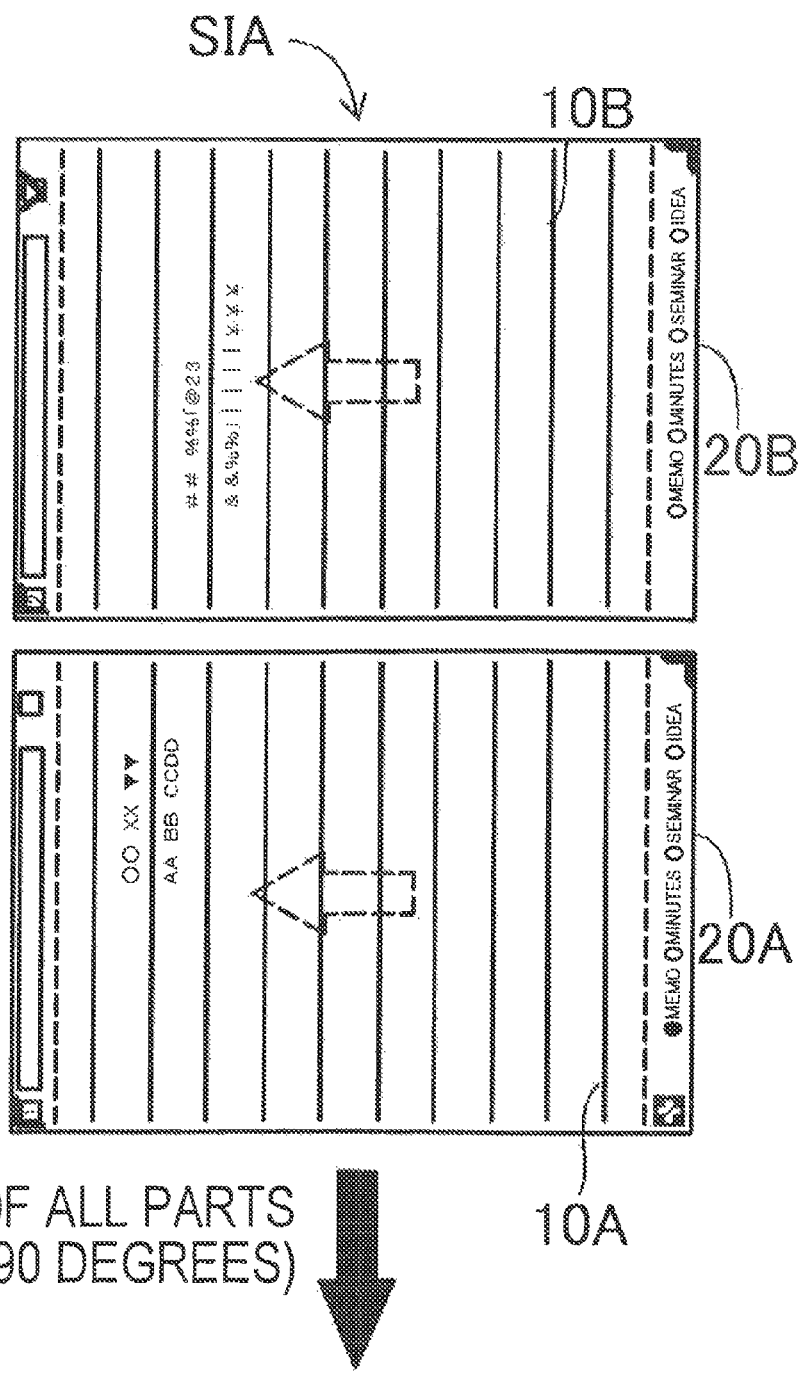
Figure 9C:
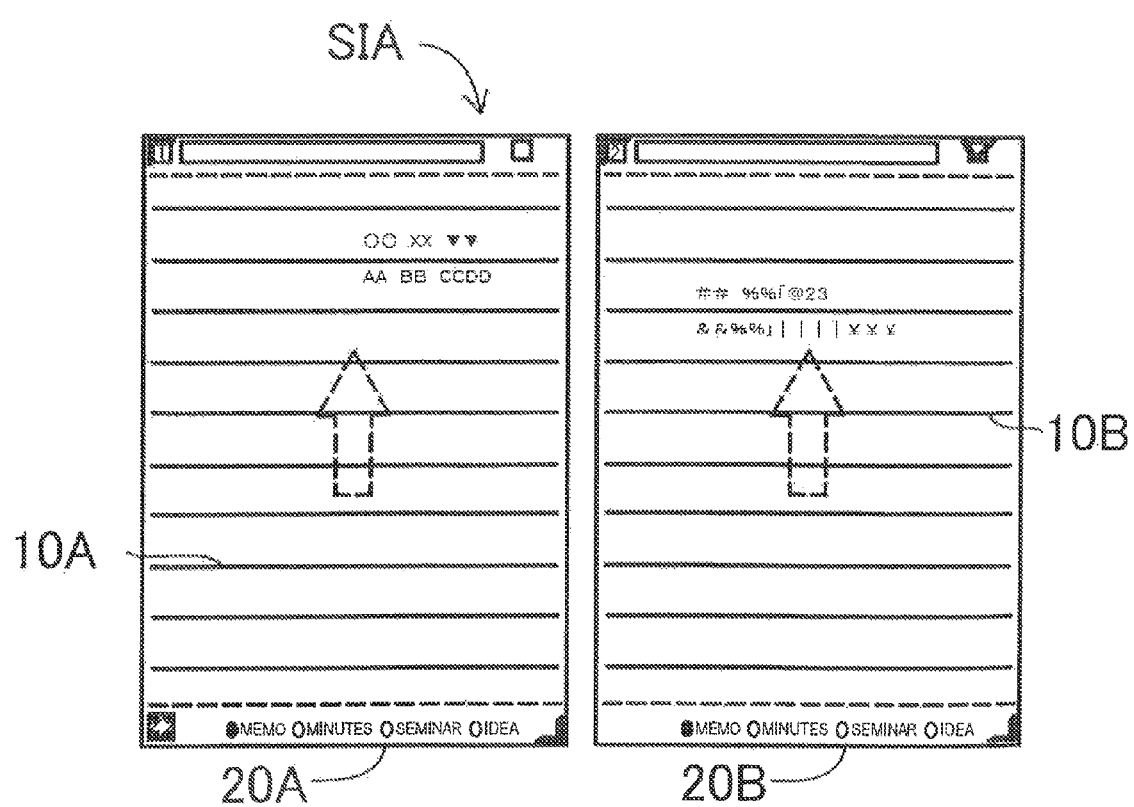
Figure 10A:
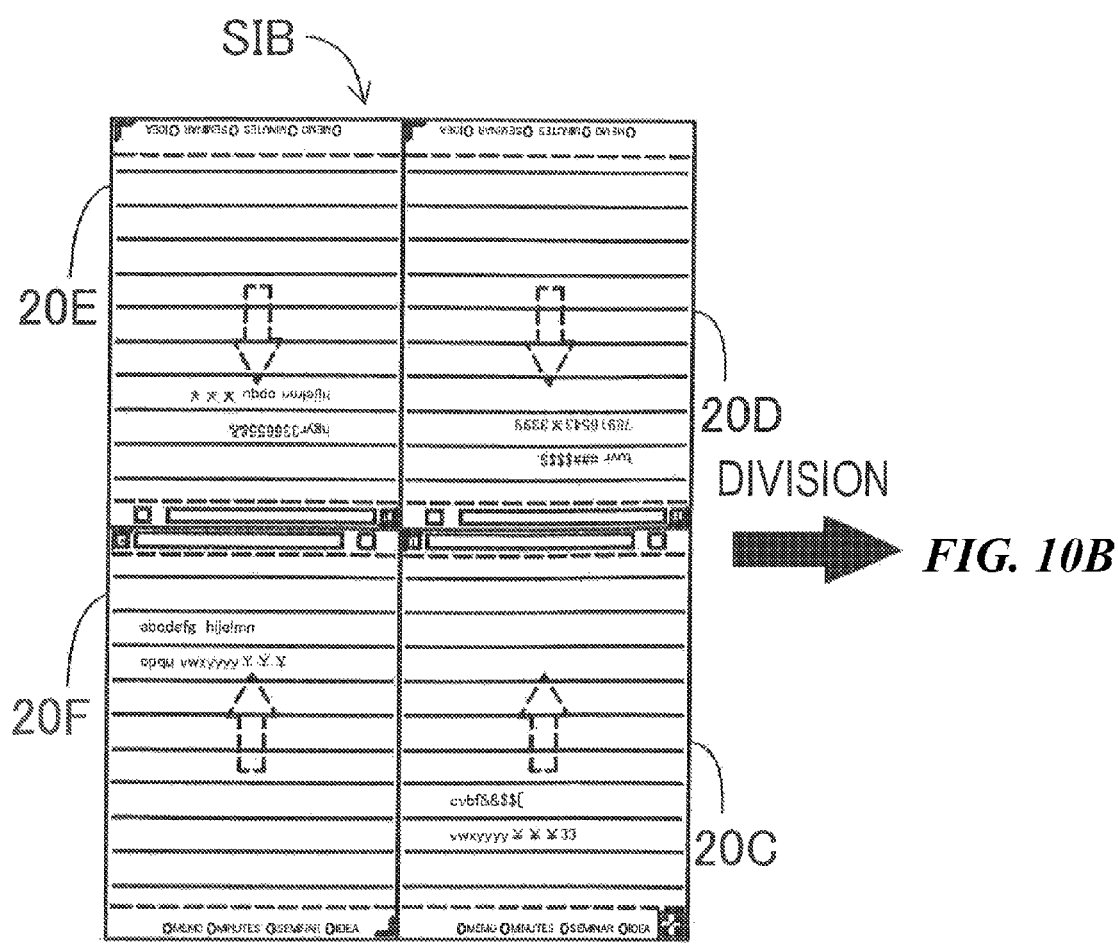

FIGS. 9A-9C and 10A-10C are explanatory views illustrating the division document generating processes. First, a document image SI which is represented by document image data (original image data) will be described. In FIG. 9A shows a first type of document image SIA which is represented by a first type of document image data which is generated by reading a first type of memo sheet MSA, and in FIG. 10A shows a second type of document image SIB which is represented by a second type of document image data which is generated by reading a second type of memo sheet MSB. Incidentally, in a case of distinguishing document images SI of specific types, alphabets (for example, 'A' or 'B') are further added to the ends of their reference symbols. A document image SI includes plural area images 20 corresponding to plural unit images 10 which is included in one template image TI printed on one memo sheet MS. Each area image 20 corresponds to a partial image of the memo sheet MS. One area image 20 represents one unit image 10 having various information written thereon. The number of area images 20 which are included in one document image SI is the same as the number of unit images 10 which are included in one template image TI, and is the value of the Z power of 2 (here, Z is a natural number), specifically, any one of 2, 4, 8, 16, 32, . . . . Also, the sizes of plural area images 20 which are included in one document image SI are almost the same as the sizes of corresponding unit images 10. Specifically, the first type of document image SIA shown in FIGS. 9A-9C includes two area images 20A and 20B, and the second type of document image SIB shown in FIGS. 10A-10C includes four area images 20C to 20F. Incidentally, in a case of distinguishing specific area images 20, alphabets (for example, 'A' or 'B') are further added to the ends of their reference symbols. The area images 20 may include corresponding unit images 10 (see FIGS. 5A to 5C) and include write information 19 (also referred to as write image) written on the memo sheet MS by the user. The write information 19 can be included in the ruled line area MA of each unit image 10 (see FIG. 5A), and can also be included in the peripheral areas of each unit image 10 (the header area HA and the footer area FA (see FIG. 5A)). Specifically, the write information 19 written by the user includes characters written in the ruled line area MA, main information such as figures (contents to be stored), and various sub-information (such as checking of the unnecessity check box 14, filling of the mark areas 16, and writing in the title area 13) (FIG. 9A) written in the peripheral areas. Hereinafter, a case of generating data files (target image data) from three sheets of document obtained by printing the template image TIB of FIG. 5C, that is, a case of processing three document image data each of which represents a document image SI including four area images 20 will be described as an example. In this case, twelve area images 20 are processed.

In FIG. 7, first, in Step S302, the multi-function apparatus 300 logs in to the image process server 200. The process of Step S302 is the same as the process of Step S105 of FIG. 2.

Next, in Step S304, the document image acquiring unit 110 receives one or more document image data from the multi-function apparatus 300 (the document image transmitting unit 316).

Next, in Step S308, the storage destination specifying unit 124 of the image information acquiring unit 120 (FIG. 1) analyzes the document image data to specify a storage destination. FIG. 8 is a flow chart illustrating a storage destination specifying process. First, in Step S600, the storage destination specifying unit 124 analyzes the document image data to detect the storage destination image 18 (QR code) in the storage destination specifying area SSA, and analyzes the detected storage destination image 18 to specify the storage destination. Next, in Step S610, the storage destination specifying unit 124 determines whether the specified storage destination is a storage server. If the storage destination is different from the storage server, the process of FIG. 8 terminates.

If the storage destination is the storage server (Yes in Step S610), in Step S620, the storage destination specifying unit 124 acquires authentication information associated with the combination of the account received in Step S302 of FIG. 7 and the storage server which is the storage destination, with reference to the authentication database 244 (FIG. 4).

Next, in Step S630, the storage destination specifying unit 124 specifies the storage destination (hereinafter, referred to as a "personal storage destination") assigned to the user ID on the storage server, according to the storage server which is the storage destination, and the user ID included in the authentication information. The personal storage destination is, for example, a storage area (a storage area assigned to the user ID) accessible by logging in to the storage server. This personal storage destination is specified, for example, according to an URL determined according to the user ID. In response to completion of specifying the personal storage destination, the process of FIG. 8 terminates.

In Step S310 of FIG. 7, the document image processing unit 100 selects one document image data to be processed. If the transmission file from the multi-function apparatus 300 includes plural document image data, the document image data are selected one by one in the order of generation of the document image data. For example, if the document image data are arranged in the order of generation in the transmission file, the document image data are selected one by one in the order of arrangement in the transmission file.

In Step S320, the generation order specifying unit 140 determines a number for the selected document image data (a document image number SN). Here, document image numbers SN are numbers to specify the document image data, and are attached in the order of generation. In the present illustrative embodiment, since the document image data are selected in the order of generation in Step S320, the document image numbers SN are attached in the order of selection in Step S320. In other words, the document image numbers SN make it possible to specify the order of generation of the document image data.

In Step S330, the image information acquiring unit 120 detects markers included in the document image SI, and specifies the layout of the document image SI. Specifically, the image information acquiring unit 120 analyzes the document image data to detect the top marker 11 and bottom marker 17 (see FIGS. 5A to 5C) of each unit image 10 included in the document image SI. As the analyzing method to detect the markers, known pattern matching or the like can be used. The image information acquiring unit 120 specifies the number and positions of area images 20 (which are the same as the number and positions of unit images 10) included in the document image SI, on the basis of positions where the markers 11 and 17 are detected.

In Step S340, the page number acquiring unit 130 acquires a page number (a document image page number SPN) corresponding to each area image 20 which is inside the document image SI and is represented by a document image data to be processed. Specifically, the page number acquiring unit 130 analyzes the document image data to acquire the page number included in the page information area 12 (see FIG. 5A) corresponding to each area image 20.

The page number acquiring unit 130 specifies the document image page numbers SPN of the individual area images 20 according to the acquired page numbers. Also, the page number of each area image 20 may be included in the information embedded in the QR code 18 (see FIG. 5A) such that correspondence to the corresponding area image 20 can be specified. In this case, the page number acquiring unit 130 may read the QR code 18 to acquire a page number corresponding to each area image 20.

In Step S350, the unnecessity condition determining unit 150 determines whether each area image 20 is a subject of skip. Specifically, the image information acquiring unit 120 analyzes the document image data to detect whether there is write information (specifically, a check mark) written in a unnecessity check box 14 (see FIG. 5A) included in each area image 20. The unnecessity condition determining unit 150 determines that an area image 20 corresponding to a unnecessity check box 14 having write information written therein is a subject of skip, and determines that an area image 20 corresponding to a unnecessity check box 14 having no write information written therein is not a subject of skip. An area image 20 determined as a subject of skip is excluded from targets to be stored in a PDF file to be generated later, as will be described below.

In Step S360, the keyword specifying unit 122 of the image information acquiring unit 120 acquires a keyword associated with each area image 20 (an associated keyword KW). Specifically, the keyword specifying unit 122 analyzes the document image data to detect whether there is write information (specifically, filling) written in the plural mark areas 16 (see FIG. 5A) included in each area image 20. The keyword specifying unit 122 acquires keywords (see the character images 15 in FIG. 5A) corresponding to the mark areas 16 having write information written therein, as the associated keywords KW associated with corresponding area images 20. The contents of the keywords corresponding to the mark areas 16 are specified on the basis of predetermined correspondence between the positions of the mark areas 16 and the contents of the keywords. For example, that correspondence is determined for each combination of a storage destination and an account of the image process server 200. In a case where the correspondence between the positions of the mark areas 16 and the keywords is not recognized by the image process server 200, the keyword specifying unit 122 may perform a known character recognition process (an OCR process) on the keyword area KA (including the character images 15) of the target image data to acquire the contents of the keywords.

In Step S370, the document image processing unit 100 determines whether all document image data received from the multi-function apparatus 300 have been selected. In a case where any unselected document image data is remaining (NO in Step S370), the document image processing unit 100 returns to Step S310 to select a new document image data, and repeats the processes of Steps S320 to S360. Meanwhile, in a case where all document image data have been selected (YES in Step S370), the document image processing unit 100 proceeds to Step S380.

Figure 11:
FIG. 11 is a view illustrating an example of a management table MT.

Also, various information acquired or specified until Step S370 are recorded in the management table MT temporarily generated in the volatile storage device 230. FIG. 11 is a view illustrating an example of the management table MT. In the management table MT, for each of the twelve area images 20 processed, the document image number SN, the document image page number SPN, skip information SK, a PDF file number PN, a PDF page number PPN, and the associated keyword KW are recorded. As described above, the document image number SN is specified in Step S320, and the document image page number SPN is acquired in Step S340. The skip information SK is information representing the result of the determination on whether each area image 20 is a subject of skip performed in Step S350. In the management table MT of FIG. 11, with respect to an area image 20 which is a subject of skip, as the skip information SK, information representing that the corresponding area image is a subject of skip is recorded, and with respect to an area image 20 which is not a subject of skip, any information is not recorded. The associated keyword KW is acquired in Step S360. The PDF file number PN and the PDF page number PPN have not been recorded until the process of Step S370 terminates.

In Step S380 of FIG. 7, the file generating unit 170 determines a specification of a PDF file to be generated. Specifically, the file generating unit 170 determines a PDF file number PN and a PDF page number PPN for each area image 20 specified by the combination of a document image number SN and a document image page number SPN, on the basis of the information having been recorded in the management table MT (FIG. 11). Hereinafter, a description (SN-SPN) may be used to represent an area image 20 specified by the combination of a document image number SN and a document image page number SPN. For example, an area image 20 specified by the combination of a document image number SN of 1 and a document image page number SPN of 2 may be represented by an area image 20 of (1-2).

Specifically, PDF file numbers PN and the PDF page numbers PPN are determined using the order of arrangement of the 12 area images 20 in the management table MT, and the associated keywords KW of the 12 area images 20. As can be seen from FIG. 11, each of the twelve area images 20 is earlier in the order of arrangement as the corresponding area image 20 is earlier in the order of generation represented by the document image numbers SN (the document image number is smaller), and with respect to four area images 20 of the same document image SI, each area image 20 is earlier in the order of arrangement as the document image page number SPN of the corresponding area image 20 is smaller. First, an area image 20 determined as a subject of skip is excluded from the process, and with respect to the corresponding area image 20, any PDF file number PN and any PDF page number PPN are not attached. For two or more area images 20 (an area image group) which are consecutive in the order of arrangement of them, and have the same associated keyword KW, the same PDF file number PN is attached. Also, for two or more area images 20 having different associated keywords KW, different PDF file numbers PN are attached. In a case where there are two area images 20 having the same associated keyword KW, and an area image 20 having a different associated keyword KW is included in area images 20 positioned between the two area images 20 in the order of arrangement, different PDF file numbers PN are attached to the two area images 20. In the example shown in FIG. 11, five area images 20 of (1-1) to (2-1) are consecutive in the order of arrangement, and their associated keywords KW are the same as 'MINUTES'. Therefore, the PDF file numbers PN of the five area images 20 are determined to 1. Two area images 20 of (2-2) and (2-3) are consecutive in the order of arrangement, and their associated keywords KW are the same as 'MEMO'. Therefore, the PDF file numbers PN of the two area images 20 are determined to 2. Four area images 20 from (2-4) to (3-3) are consecutive in the order of arrangement, and their associated keywords KW are the same as 'IDEA'. Therefore, the PDF file numbers PN of the four area images 20 are determined to 3.

Also, the file generating unit 170 attaches PDF page numbers PPN beginning with 1 to one or more area images 20 having the same PDF file number PN, in the order of arrangement. Specifically, as shown in FIG. 11, to five area images 20 having PDF file numbers PN of 1, PDF page numbers PPN of 1 to 5 are attached in the order of arrangement. To two area images 20 having PDF file numbers PN of 2, PDF page numbers PPN of 1 and 2 are attached in the order of arrangement. To four area images 20 having PDF file numbers PN of 3, PDF page numbers PPN of 1 to 4 are attached in the order of arrangement.

In Step S390 of FIG. 7, the area image generating unit 160 performs an area image data generating process on the three document image data to generate area image data representing the twelve area images 20 included in the three document images SI. However, an area image data representing an area image 20 of (3-4) determined as a subject of skip may not be generated.

Figure 12:
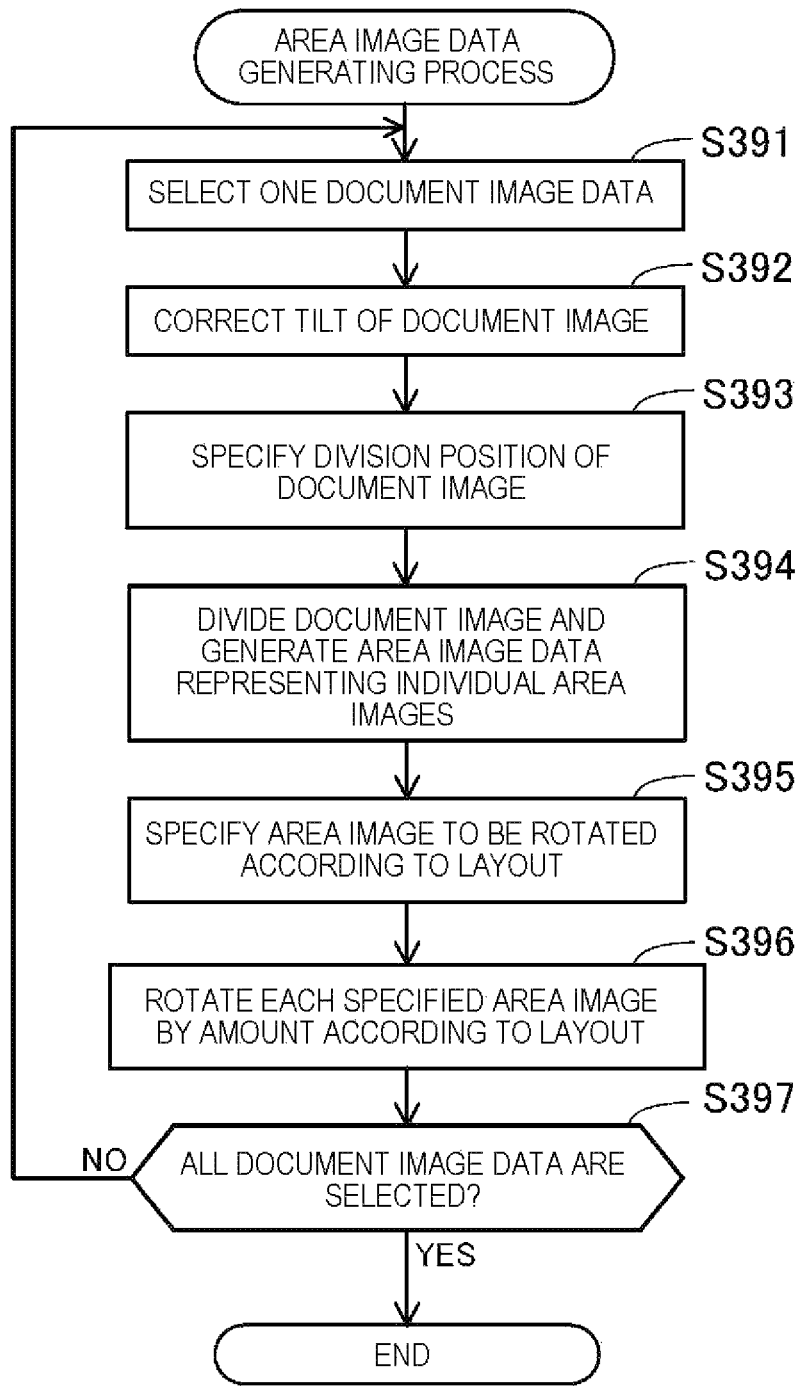
FIG. 12 is a flow chart illustrating an area image data generating process.

FIG. 12 is a flow chart illustrating the area image data generating process. In Step S391, the area image generating unit 160 selects one document image data to be processed. In Step S392, the area image generating unit 160 performs a tilt correcting process on the selected document image data to correct the tilt of a document image SI represented by the document image data. The tilt correcting process includes a process of computing a tilt angle based on the coordinates of the markers 11 and 17 included in the document image SI, and a rotating process of rotating the document image SI by the computed tilt angle. A specific computing method may be performed using a known technique.

In Step S393, the area image generating unit 160 uses the document image data subjected to the tilt correcting process to specify a division position in the document image SI. For example, the division position may be specified on the basis of the coordinates of the markers 11 and 17 included in the document image SI. In a case where the document image SI is a first type of document image SIA including two area images 20A and 20B as shown in FIG. 9B, a division position is a straight line connecting two middle points dividing two long sides of the first type of document image SIA almost equally, respectively. Also, in a case where the document image SI is a second type of document image SIB including four area images 20C to 20F as shown in FIG. 10B, division positions are a straight line connecting two middle points dividing two long sides of the second type of document image SIB almost equally, respectively, and a straight line connecting two middle points dividing two short sides of the second type of document image SIB almost equally, respectively.

In Step S394, the area image generating unit 160 divides the document image SI at the specified division position, and generates area image data representing individual area images 20 included in the document image SI. In the case where the document image SI is a first type of document image SIA including two area images 20 as shown in FIG. 9B, two area image data representing the two area images 20A and 20B, respectively, are generated. Also, in the case where the document image SI is a second type of document image SIB including four area images 20C to 20F as shown in FIG. 10B, four area image data representing the four area images 20C to 20F, respectively, are generated.

In Step S395, the area image generating unit 160 specifies an area image 20 to be rotated, according to the layout of the document image SI. Specifically, in a case where the document image SI is the first type of document image SIA shown in FIGS. 9A-9C, all area images, that is, the two area images 20A and 20B are specified as area images to be rotated. In a case where the document image SI is the second type of document image SIB shown in FIGS. 10A-10C, some area images, that is, two area images 20D and 20E having document image page numbers SPN of 2 and 3 are specified as area images to be rotated.

In Step S396, the area image generating unit 160 performs the rotating process of rotating each specified area image 20 by an amount of rotation according to the layout, on the area image data representing the corresponding specified area image 20. Specifically, in the case where the document image SI is the first type of document image SIA shown in FIGS. 9A-9C, the two area images 20A and 20B are rotated 90 degrees clockwise. Also, if the reading direction of the image reading unit 380 during generating of document image data is reversed, the state of a first type of document image SIA may be in an opposite direction to the state shown in FIG. 9B. In this case, the area image generating unit 160 needs only to rotate the two area images 20A and 20B 90 degrees counterclockwise. As a result, the two area image data are converted to represent the two area images 20A and 20B in a state where the area images are oriented in appropriate directions. A state where an image is oriented in an appropriate direction may be a state where the image is oriented in a direction in which an observer feels that the upper sides of the image is oriented upward as seeing the image. For example, in a case of a character image, a state where the image is oriented in an appropriate direction is a state where the upper sides of characters in the character image are oriented upward. For example, in a case of a unit image 10 included in an area image 20, a state where a direction shown by a broken line arrow in FIG. 5A is oriented upward is a state where the unit image is oriented in an appropriate direction.

Figure 10C:
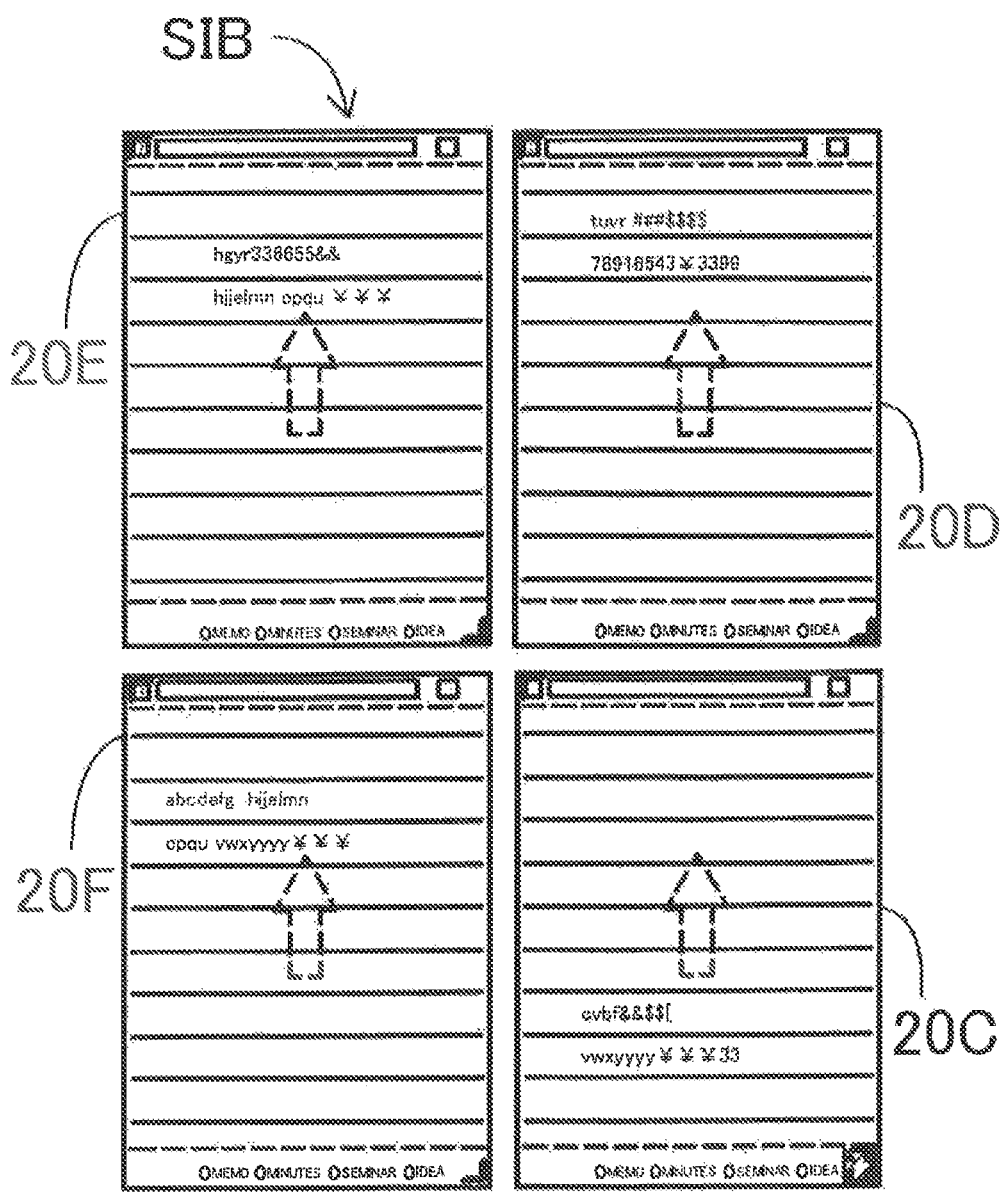

Similarly, in a case where the document image SI is the second type of document image SIB shown in FIGS. 10A-10C, each of the two area images 20D and 20E is rotated 180 degrees. As a result, the four area images 20C to 20F are oriented in the same direction, and the four area image data are converted such that the four area images 20C to 20F are oriented in appropriate directions. Also, if the reading direction of the image reading unit 380 during generating of document image data is reversed, a second type of document image SIB may be in an opposite direction to the state shown in FIG. 10B. In other words, in the document image SIB, the area images 20C and 20F corresponding to page numbers of 1 and 4 may be positioned on the upper side in FIGS. 10A-10C, and the area images 20D and 20E corresponding to page numbers of 2 and 3 may be positioned on the lower side in FIGS. 10A-10C. In this case, the area image generating unit 160 needs only to rotate each of the two area images 20C and 20F 180 degrees.

In Step S397, the area image generating unit 160 determines whether all document image data have been selected. In a case where any unselected document image data is remaining (NO in Step S397), the area image generating unit 160 returns to Step S391 to select a new document image data, and repeats the processes of Steps S392 to S396. Meanwhile, in a case where all document image data have been selected (YES in Step S397), the area image generating unit 160 terminates the area image data generating process.

If the area image data generating process terminates, in Step S400 of FIG. 7, the file generating unit 170 uses the plural generated area image data to generate a file in a portable document format (PDF) (a PDF file). The PDF file is a file having the concept of pages, and can store one or more image data in association with each of an arbitrary number of pages. In the PDF file, with respect to an image represented by each image data associated with a page, it is possible to designate the layout position on the page, a layout angle, and so on. The user can use a browsing program (viewer) to browse images represented by the image data stored in the PDF file, like plural pages of sheets, on a display.

Figures 13A, 13B:
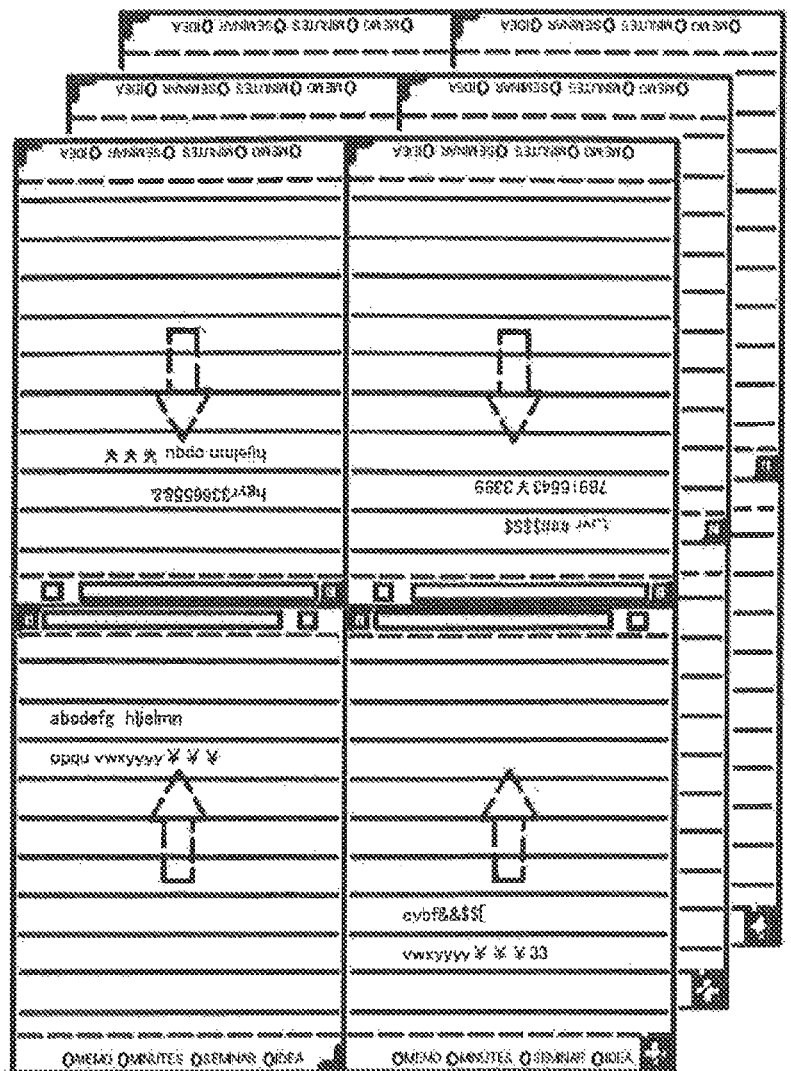
FIGS. 13A and 13B are views illustrating generation of a PDF file.
Figure 13B:
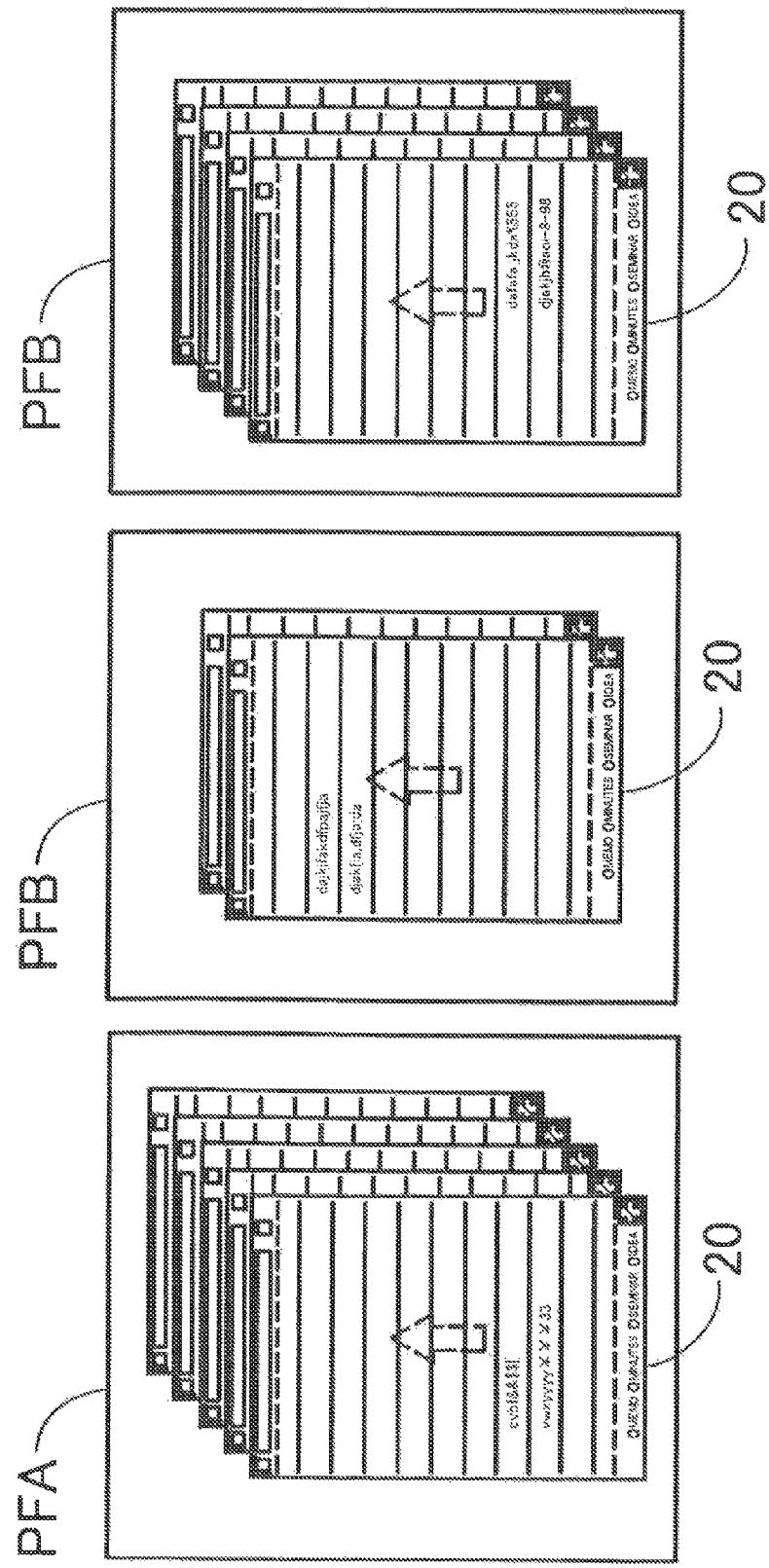

FIGS. 13A and 13B are views illustrating generation of a PDF file. Specifically, the file generating unit 170 generates three PDF files PFA, PFB, and PFC according to the PDF file number PN and the PDF page number PPN recorded for each area image 20 in the management table MT shown in FIG. 11. In the PDF file PFA, five area image data having PDF file numbers PN of 1 are stored. Five area images 20 represented by the five area image data stored in the PDF file PFA are disposed in pages of corresponding PDF page numbers PPN. Similarly, in the PDF file PFB, two area image data having PDF file numbers PN of 2 are stored, and the two area image data are disposed in pages of corresponding PDF page numbers PPN. In the PDF file PFC, four area image data having PDF file numbers PN of 3 are stored, and the four area image data are disposed in pages of corresponding PDF page numbers PPN. Here, an area image data corresponding to one area image 20 determined as a subject of skip is not stored in the generated PDF files.

As a result, among the twelve area images 20 included in an image group SIG (FIG. 13A) composed of the three document images SI, eleven area images 20 except for one area image 20 determined as a subject of skip are classified into and stored in the three PDF files PFA, PFB, and PFC (FIG. 13B).

Next, in Step S402 of FIG. 7, the association setting unit 180 associates the keywords specified in Step S360 with the generated PDF files. In the present illustrative embodiment, association of the keywords with the PDF files is performed for each PDF file. With one target PDF file, all keywords detected from all area images 20 included in the corresponding target PDF file are associated. For example, in the example of FIG. 11, with a PDF file having a file number of 1, a keyword 'MINUTES' is associated, and with a PDF file having a file number of 2, a keyword 'MEMO' is associated, and with a PDF file having a file number of 3, a keyword 'IDEA' is associated. Data representing the association is stored in the volatile storage device 230 and is referred to in a process to be described below. Also, the association setting unit 180 may embed data representing the keywords, as metadata, in the PDF files.

Next, in Step S410, the file providing unit 190 determines whether the storage destination is a storage server.

If the storage destination is the storage server (Yes in Step S410), in Step S420, the file providing unit 190 uses the authentication information acquired in Step S308 (Step S620 in FIG. 8), to log in to the storage server which is the storage destination.

Next, in Step S430, the file providing unit 190 transmits (provides) the PDF files, and information representing the keywords associated with the PDF files (which will hereinafter be referred to as "keyword information", and an example of which is text data), to the storage server which is the storage destination. Specifically, the PDF files and the keyword information are provided to the personal storage destination which becomes accessible after the login. The storage server stores the received PDF files in a storage area assigned to the user ID, and associates the received keywords with the stored PDF files. For example, in a case where the storage destination is the first storage server 510, the CPU 520 of the first storage server 510 registers the keywords as tags of the stored PDF files. In a case where the storage destination is the second storage server 520, the CPU 522 of the second storage server 520 stores the PDF files in folders specified by the keywords. In a case where the storage destination is a storage server (the third storage server 530) which does not support the keywords, the keywords is not provided (even in this case, the keywords can be included as metadata in the PDF files). The user can use a client device such as the personal computer 400 or a portable terminal (not shown) to access to the PDF files (for example, the PDF files PFA, PFB, and PFC) stored in the storage server 500. In response to completion of providing the PDF files and the keyword information, the process of FIG. 7 terminates.

In a case where the storage destination is different from the storage server (No in Step S410), in Step S440, the file providing unit 190 transmits (provides) the PDF files to the storage destination. For example, in a case where the storage destination is a media card, the file providing unit 190 transmits (provides) the PDF files to the multi-function apparatus 300 having the media card interface 390. The multi-function apparatus 300 stores the received PDF files in a media card (for example, a flash memory) inserted into the media card interface 390. In response to completion of providing the PDF files, the process of FIG. 7 terminates.

As described above, the template generating unit 50 of the image process server 200 (FIG. 1) generates template image data representing a template image (FIG. 5B or 5C) including a body area MA and a keyword area KA (Steps S105 to S140 in FIG. 2), and the template providing unit 60 provides the generated template image data to the multi-function apparatus 300 (the printing unit 370) (Step S150 in FIG. 2). Therefore, the user can write on a sheet having the template image printed thereon, thereby easily selecting a keyword to be associated with target image data (a PDF file). Also, the keyword specifying unit 122 analyzes original image data generated by optically reading a document (for example, FIG. 6C) including a printed template image and information written on the template image (including information for specifying keywords) to specify a keyword to be associated with target image data (Step S360 in FIG. 7). Therefore, the association setting unit 180 can appropriately associate the keyword specified by writing of the user, with the target image data (Step S402 in FIG. 7).

Also, as shown in FIG. 5A, the keyword area KA includes the character images 15 representing the plural keywords (candidates). Therefore, the user can observe the keyword area KA and easily confirm the plural keywords.

Also, in Step S240 of FIG. 3, the keyword acquiring unit 40 acquires plural keywords from the storage server through a network (the LAN 600 and the Internet 700). Therefore, it is easy to prepare the plural keywords (candidates). Also, the keyword acquiring unit 40 acquires a set of plural keywords associated with each user. Therefore, for each user, it is possible to use plural keywords suitable for the user.

Also, as described with reference to FIGS. 5B and 5C, one template image (a template image associated with one sheet of document) includes AN-number of unit images 10 (corresponding to partial images of the template image) (wherein, AN is 2 or more). Further, each of the AN-number of unit images 10 includes a keyword area KA and a body area MA. Therefore, the user can select an appropriate keyword with respect to each of the AN-number of unit images 10.

Also, the template generating unit 50 of the image process server 200 generates template image data representing a template image (FIG. 5B or 5C) including a body area MA and a storage destination specifying area SSA (Steps S105 to S140 in FIG. 2), and the template providing unit 60 provides the generated template image data to the multi-function apparatus 300 (the printing unit 370) (Step S150 in FIG. 2). Therefore, in a case where there is information written in the body areas MA of the printed template image, the storage destination of the target image data (PDF files) representing target images including the written information is specified by the storage destination specifying area SSA. As a result, it becomes easy to store the target image data in an intended storage destination. Also, the storage destination specifying unit 124 of the image process server 200 analyzes original image data generated by optically reading a document (for example, FIG. 6C) including a printed template image (including a storage destination specifying area SSA) to specify the storage destination (Step S308 in FIG. 7). Therefore, the file providing unit 190 can appropriately provide the target image data to an intended storage destination (Steps S430 and S440 in FIG. 7).

Also, in a case where the specified storage destination is a server connected to the network (Yes in Step S410 of FIG. 7), the file providing unit 190 provides the target image data to the server which is the storage destination (Step S430 in FIG. 7). Therefore, it is possible to easily store the target image data in the server. Also, the storage destination specifying unit 124 specifies the personal storage destination on the server assigned to the user ID (Step S630 in FIG. 8). Then, the file providing unit 190 provides the target image data to the specified personal storage destination (Step S430 in FIG. 7). Therefore, it is possible to easily store target image data in a personal storage destination for each user.

Also, according to an instruction of the user, the template generating unit 50 selects one storage destination from plural storage destination candidates (Step S122 in FIG. 2), and generates data representing a template image (FIG. 5B or 5C) including a storage destination specifying area SSA including a storage destination image 18 representing the selected one storage destination (Steps S123 and S140 in FIG. 2). Therefore, a storage destination suitable for the intention of the user can be easily specified.

Also, as described with reference to FIGS. 5B and 5C, one template image (a template image associated with one sheet of document) includes AN-number of unit images 10 (wherein, AN is 2 or more). Then, each of the AN-number of unit images 10 includes a body area MA, and one unit image 10 of the AN-number of unit images 10 includes a storage destination specifying area SSA. Therefore, a storage destination specified by the storage destination specifying area SSA can be used as the storage destination of the entire template image.

B. Second Illustrative Embodiment

Figures 14, 15:
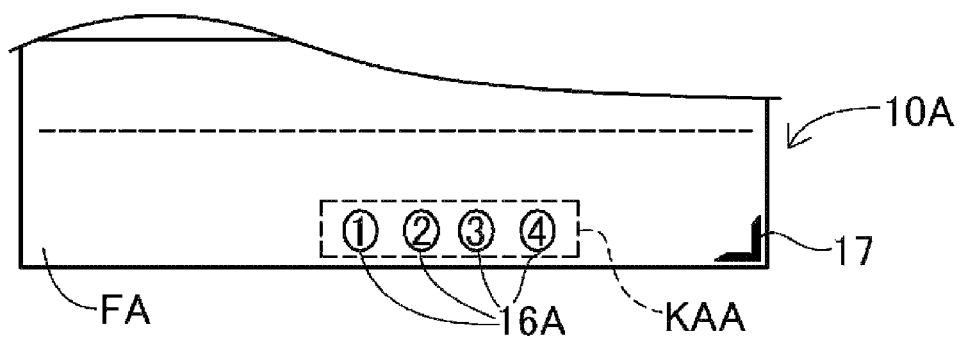
FIG. 14 is a schematic view illustrating another example of the management table.
FIG. 15 is a schematic view illustrating a keyword area according to another illustrative embodiment.

FIG. 14 is a schematic view illustrating an example of a management table generated in a second illustrative embodiment. Differently from the first illustrative embodiment shown in FIG. 11, in the second illustrative embodiment, the file generating unit 170 generates one PDF file from one sheet of document (one document image data). In other words, the PDF file number PN is the same as the document image number SN. In a case where one document image includes plural area images 20, different keywords can be specified from the plural area images 20 included in one PDF file. For example, in the example of FIG. 14, 'MIN- UTES', 'MEMO', and 'IDEA' are specified from four area images 20 having PDF file numbers PN of 1. The association setting unit 180 associates the specified all keywords with a PDF file having a PDF file number of 1 (FKW in FIG. 14). Also, in one area image 20, plural keywords may be selected. For example, in the example of FIG. 14, two keywords ('SEMINAR' and 'MINUTES') are specified from an area image 20 having a PDF file number of 2 and a PDF page number PPN of 1. Also, one keyword 'MEMO' is specified from three area images 20 having PDF file numbers PN of 2 and PDF page numbers PPN of 2, 3, or 4. Even in this case, the association setting unit 180 associates the specified all keywords with a PDF file having a PDF file number of 2 (FKW in FIG. 14).

Also, a condition for changing PDF file numbers PN is not limited to changing of document image numbers SN, but may be any other conditions. For example, the file generating unit 170 may store all area images 20 to be processed in one document generating process (FIG. 7) in one PDF file.

In any cases, it is preferable that the association setting unit 180 should associate all keywords specified from all area images 20 included in one PDF file, with the corresponding PDF file, so that the degree of freedom of association between PDF files and keywords becomes high. For example, plural keywords can be associated with one PDF file. Therefore, in a case of using keywords to search for a data file (for example, a case where the storage destination is the first storage server 510), even if the user cannot remember associated keywords, the user can use some guessable keywords to search to easily search for a desired data file. Also, in a case where keywords are embedded as metadata in PDF files, the user can search the metadata to easily detect a desired PDF file.

Also, in a case where keywords are used as folder names, one keyword selected from one or more keywords associated with one PDF file can be used as a folder name. As one keyword to be selected, for example, a keyword firstly specified from the area image 20 of the first page (PPN=1) can be used.

C. Third Illustrative Embodiment

FIG. 15 is a schematic view illustrating another illustrative embodiment of the keyword area. In FIG. 15, a footer area FA of a unit image 10A is shown. In a keyword area KKA provided in the footer area FA, plural mark areas 16A representing plural keywords, respectively, are provided. In the individual mark areas 16A, keyword IDs (numerals of 1 to 4 here) are written. That is, in the example of FIG. 15, a keyword area KA (that is, an unit image 10) can be simplified. Also, similarly to the above-mentioned illustrative embodiments, correspondence between IDs (the positions of the mark areas 16A) and keywords are determined in advance. For example, that correspondence is determined for each combination of a storage destination and an account of the image process server 200. Also, according to an instruction of the user, the template acquiring unit 314 of the multi-function apparatus 300 may display that correspondence on the display unit 360.

D. Fourth Illustrative Embodiment

Figure 16A:
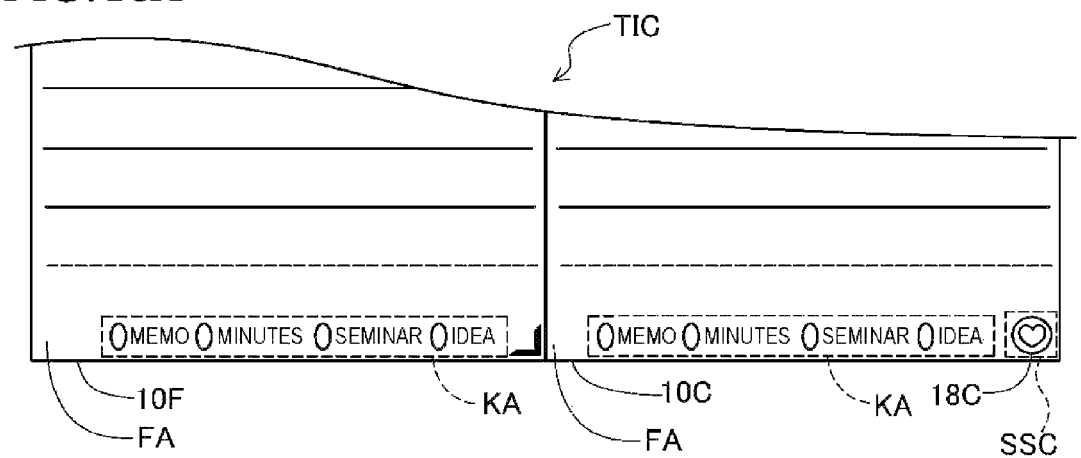
FIGS. 16A and 16B are schematic views illustrating a storage destination specifying area according to another illustrative embodiment.
Figure 16B:
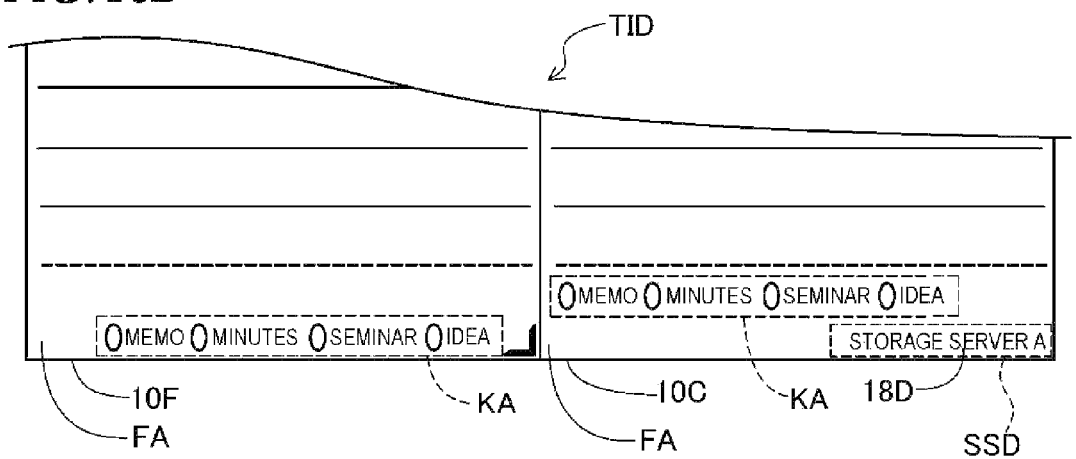

FIGS. 16A and 16B are schematic views illustrating other illustrative embodiments of the storage destination specifying area. A template image TIC of FIG. 16A includes an icon image 18C representing one storage destination, in a storage destination specifying area SSC. The user can observe the icon image 18C and easily recognize the one storage destination. The storage destination specifying unit 124 can analyze the icon image 18C to specify the one storage destination. A template image TID of FIG. 16B includes a character image 18D representing one storage destination, in a storage destination specifying area SSD. Also, the template generating unit 50 shifts the position of the keyword area KA in a direction away from the edge of the template image TID (to the upper side of FIG. 16B) such that the keyword area KA does not overlap the storage destination specifying area SSD in an unit image 10C. The user can observe the character image 18D and easily recognize the one storage destination. The storage destination specifying unit 124 can analyze the character image 18D to specify the one storage destination. In general, it is preferable that a storage destination specifying area should include a single storage destination image which is an image from which the user can recognize one storage destination. In this case, the user can recognize the one storage destination on the basis of the single storage destination image of the storage destination specifying area. Here, it is preferable that the single storage destination image should be an image (such as an icon or a text) from which the user can recognize one storage destination without referring to other information. In this case, the user can easily recognize the one storage destination.

Modifications (1) In FIG. 3, Step S250 may be omitted. In other words, the keyword acquiring unit 40 may use all of plural acquired keywords as candidates. Here, in a case where the total number of acquired keywords exceeds a predetermined maximum number (for example, 4) which can be provided for a unit image 10, the keyword acquiring unit 40 may select the predetermined maximum number of keywords according to a predetermined priority order (for example, in order of frequency of use). Also, in a case where the total number of acquired keywords is smaller than the predetermined maximum number, the keyword acquiring unit 40 may add a predetermined keyword to acquire the predetermined maximum number of keywords as candidates. Also, in Step S128 of FIG. 2, the keyword acquiring unit 40 may acquire keywords input by the user, as keyword candidates. As a method of acquiring keywords input by the user, an arbitrary method can be used. For example, the user operates the operating unit 350 of the multi-function apparatus 300 to input keywords to the multi-function apparatus 300. The keyword acquiring unit 40 acquires the input keywords from the multi-function apparatus 300. Also, the non-volatile storage device 240 of the image process server 200 may store keyword candidates for each account in advance. The keyword acquiring unit 40 may acquire plural keywords associated with an account, from the non-volatile storage device 240.

(2) The number of unit images 10 (allocation number AN) in a template image TI may be "1".

(3) As the format of target image data, various formats can be used. For example, not only the PDF but also arbitrary formats (for example, a XML Paper Specification (XPS) format) capable of outputting (printing or displaying) plural pages page-by-page can be used. Also, formats (for example, a JPEG format) which have not been intended to be output page-by-page may be used. In this case, the file generating unit 170 may use each of plural area image data representing plural area images 20, to generate plural data files (for example, data files in the JPEG format) independent from each other. In any cases, the entire group of the area image generating unit 160 and the file generating unit 170 corresponds to a target image data providing unit. Also, document image data (original image data) may be provided as target image data, without any changes. In this case, the page number acquiring unit 130, the generation order specifying unit 140, the unnecessity condition determining unit 150, and the area image generating unit 160 may be omitted. In general, as target image data, image data representing at least a portion of an image represented by original image data can be used.

(4) In a case where a template image TI includes plural unit images 10, each of the unit images 10 may include a storage destination specifying area. In this case, storage destinations depend on the unit images 10.

(5) In a case where a template image TI includes plural unit images 10, only in the keyword areas KA of some unit images 10 (area images 20), information for specifying keywords may be written. In this case, if area images are arranged in an order determined according to the combinations of their document image numbers SN and their document image page numbers SPN, with an area image 20 whose keyword has not been specified, the keyword of the previous area image 20 may be associated. In a case where plural area images 20 having no keywords are consecutive, with the plural area images 20, keywords of the previous area image 20 of the plural area images 20 are associated. In this case, the user does not need write the same keyword in the plural area images 20.

(6) In the above-mentioned various processes, the analysis of document image data (original image data) can be replaced with analysis of area image data. In this case, the entire group of a processing unit for performing analysis, and the area image generating unit 160 for generating area image data corresponds to a processing unit for performing analysis. For example, in a case where the keyword specifying unit 122 analyzes area image data to specify keywords, the entire group of the keyword specifying unit 122 and the area image generating unit 160 corresponds to a keyword specifying unit for analyzing document image data (original image data), thereby specifying keywords.

(7) The image reading unit for generating document image data needs only to be a device for optically reading a document. Therefore, the image reading unit is not limited to the scanner of the illustrative embodiments, but may be a digital camera.

(8) Some or all of functions implemented by the image process server 200 in the above-mentioned illustrative embodiments may be implemented by the multi-function apparatus 300. For example, the function of the document image processing unit 100 may be implemented by the multi-function apparatus 300. In this case, the multi-function apparatus 300 uses the function of the document image processing unit 100 which the multi-function apparatus 300 has, to perform the above-mentioned process on the document image data which the image reading unit 380 has generated in response to the instruction of the user, thereby generating PDF files. Also, some or all of functions implemented by the image process server 200 may be implemented by the personal computer 400. Further, the PDF file storage destination is not limited to the storage server 500, but may be a storage device included in the case of the personal computer 400 or the multi-function apparatus 300, a portable memory such as a USB memory connected to the personal computer 400 or the multi-function apparatus 300, or the image process server 200.

(9) Plural apparatuses (for example, computers) capable of communication with one another through the network may share the functions of the image process server 200 (for example, the functions of the document image processing unit 100), and provide the functions of the image process server 200 as a whole (a system including those apparatuses corresponds to an image processing apparatus).

(10) A part of a configuration implemented by hardware in the above-mentioned illustrative embodiments may be replaced with software, or a part or all of a configuration implemented by software in the above-mentioned illustrative embodiments may be replaced with hardware. For example, the functions of the document image processing unit 100 of FIG. 1 may be implemented by a dedicated hardware circuit having logic circuits.

Also, in a case where some or all of the functions of the present invention are implemented by a computer program, this program can be stored in a recording medium (for example, a recording medium which is not temporary) to be provided. The program may be recorded on a recording medium (a computer-readable recording medium) to be provided for use, or may be recorded on a recording medium (a computer-readable recording medium) to be provided and be copied in another recording medium (a computer-readable recording medium) for use. Examples of the computer-readable recording media include not only portable recording media such as memory cards and CD-ROMs, but also internal storage devices such as various ROMs in computers, and external storage devices such as hard disk drives connected to computers.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. An image processing apparatus comprising:
a processor; and
memory storing computer readable instructions, when executed by the processor, causing the image processing apparatus to:
acquire plural keywords including a first keyword and a second keyword different from the first keyword;
generate template image data representing a template image using the acquired plural keywords, the template image including a body area for writing information therein by a user, and also including a keyword area including plural character images representing the plural keywords, respectively, wherein the keyword area is for writing information therein by the user for specifying a target keyword from among the plural keywords, the target keyword specifying a folder which is for storing a target image data file and is comprised in a storage server, the target image data file representing a target image including the body area having information written therein by the user;
provide the generated template image data to a printing unit for printing the template image the body area and the keyword area;
after providing the template image data, acquire a transmission file including a first original image data generated by optically reading a first document including the template image and a second original image data generated by optically reading a second document including the template image and being different from the first document, wherein the first document includes a first body area having information written therein by the user and a first keyword area having information written therein by the user for specifying the first keyword as the target keyword from the plural keywords, and the second document includes a second body area having information written therein by the user and a second keyword area having information written therein by the user for specifying the second keyword as the target keyword from the plural keywords;

specify the first keyword as the target keyword from the plural keywords by analyzing the first keyword area in the first original image data included in the acquired transmission file;

specify the second keyword as the target keyword from the plural keywords by analyzing the second keyword area in the second original image data included in the acquired transmission file;

generate a first target image data file representing a first target image including the first body area by using the first original image data included in the acquired transmission file;

generate a second target image data file representing a second target image including the second body area by using the second original image data included in the acquired transmission file;

after specifying the first keyword as the target keyword, transmit the generated first target image data file to the storage server through a network so as to store the generated first target image data file in a first folder which is comprised in the storage server and specified by the first keyword; and after specifying the second keyword as the target keyword, transmit the generated second target image data file to the storage server through the network so as to store the generated second target image data file in a second folder which is comprised in the storage server and specified by the second keyword.

2. The image processing apparatus according to claim 1, wherein the computer readable instructions, when executed by the processor, cause the image processing apparatus to:

acquire the plural keywords from the storage server through the network.

3. The image processing apparatus according to claim 1, wherein the plural keywords further includes a third keyword different from the first keyword and the second keyword, wherein the template image includes a first partial image and a second partial image different from the first partial image, the first partial image including the body area and the keyword area, the second partial image including the body area and the keyword area, wherein the first document includes the first partial image and the second partial image, the first partial image of the first document including the first body area and the first keyword area, the second partial image of the first document including a third body area having information written therein by the user and the first keyword area, wherein the second document includes the first partial image and the second partial image, the first partial image of the second document including the second body area and the second keyword area, the second partial image of the second document including a fourth body area having information written therein by the user and a third keyword area for writing information therein by the user for specifying the third keyword as the target keyword from among the plural keywords, wherein the computer readable instructions, when executed by the processor, further causes the image processing apparatus to:

specify the first keyword as the target keyword from the plural keywords by analyzing the first keyword area in the first partial image of the first original image data included in the acquired transmission file, and specify the first keyword as the target keyword from the plural keywords by analyzing the second keyword area in the second partial image of the first original image data included in the acquired transmission file;

specify the second keyword as the target keyword from the plural keywords by analyzing the second keyword area in the first partial image of the second original image data included in the acquired transmission file, and specify the third keyword as the target keyword from the plural keywords by analyzing the third keyword area in the second partial image of the second original image data included in the acquired transmission file;

in a case where the first keyword in the first partial image of the first original image data is same as the first keyword in the second partial image of the first original image data, generate the first target image data file representing the first target image including plural pages using the first partial image and the second partial image in the first original image data included in the acquired transmission file, the plural pages including a first page representing the first body area and a second page representing the third body area;

in a case where the second keyword in the first partial image of the second original image data is different from the third keyword in the second partial image of the second original image data, generate the second target image data file using the first partial image in the second original image data included in the acquired transmission file, and generate a third target image data file representing the fourth body area using the second partial image in the second original image data included in the acquired transmission file; and after specifying the third keyword as the target keyword, transmit the generated third target image data file to the storage server through the network so as to store the generated third target image data file in a third folder which is comprised in the storage server and specified by the third keyword.

4. The image processing apparatus according to claim 1, wherein the computer readable instructions, when executed by the processor, further cause the image processing apparatus to:

acquire user identification information;

acquire the plural keywords based on the acquired user identification information, wherein in a case where the user identification information represents a first user, the acquiring operation acquires a first set of plural keywords associated with the first user, and in a case where the user identification information represents a second user, the acquiring operation acquires a second set of plural keywords associated with the second user, and wherein in a case where the user identification information represents the first user, the template image includes the keyword area including the plural character images representing the first set of plural keywords, respectively, and in a case where the user identification information represents the second user, the template image includes the keyword area including the plural character images representing the second set of plural keywords, respectively.

5. A non-transitory computer-readable medium having a computer program stored thereon and readable by a computer, the computer program, when executed by the computer, causing the computer to perform:
   acquiring plural keywords including a first keyword and a second keyword different from the first keyword;
   generating template image data representing a template image using the acquired plural keywords, the template image including a body area for writing information therein by a user, and also including a keyword area including plural character images representing the plural keywords, respectively, wherein the keyword area is for writing information therein by the user for specifying a target keyword a target image data file and is comprised in a storage server, the target image data file representing a target image including the body area having information written therein by the user
   providing the generated template image data to a printing unit for printing the template image including the body area and the keyword area;
   after providing the template image data, acquiring a transmission file including a first original image data generated by optically reading a first document including the template image and a second original image data generated by optically reading a second document including the template image and being different from the first document, wherein the first document includes a first body area having information written therein by the user and a first keyword area having information written therein by the user for specifying the first keyword as the target keyword from the plural keywords, and the second document includes a second body area having information written therein by the user and a second keyword area having information written therein by the user for specifying the second keyword as the target keyword from the plural keywords;
   specifying the first keyword as the target keyword from the plural keywords by analyzing the first keyword area in the first original image data included in the acquired transmission file;
   specifying the second keyword as the target keyword from the plural keywords by analyzing the second keyword area in the second original image data included in the acquired transmission file;
   generating a first target image data file representing a first target image including the first body area by using the first original image data included in the acquired transmission file;
   generating a second target image data file representing a second target image including the second body area by using the second original image data included in the acquired transmission file;
   after specifying the first keyword as the target keyword, transmitting the generated first target image data file to the storage server through a network so as to store the generated first target image data file in a first folder which is comprised in the storage server and specified by the first keyword; and
   after specifying the second keyword as the target keyword, transmitting the generated second target image data file to the storage server through the network so as to store the generated second target image data file in a second folder which is comprised in the storage server and specified by the second keyword.

6. The non-transitory computer-readable medium according to claim 5,
   wherein the computer program, when executed by the computer, further causes the computer to perform:
   acquiring the plural keywords from the storage server through the network.

7. The non-transitory computer-readable medium according to claim 5,
   wherein the plural keywords further includes a third keyword different from the first keyword and the second keyword,
   wherein the template image includes a first partial image and a second partial image different from the first partial image, the first partial image including the body area and the keyword area, the second partial image including the body area and the keyword area,
   wherein the first document includes the first partial image and the second partial image, the first partial image of the first document including the first body area and the first keyword area, the second partial image of the first document including a third body area having information written therein by the user and the first keyword area,
   wherein the second document includes the first partial image and the second partial image, the first partial image of the second document including the second body area and the second keyword area, the second partial image of the second document including a fourth body area having information written therein by the user and a third keyword area for writing information therein by the user for specifying the third keyword as the target keyword from among the plural keywords,
   wherein the computer program, when executed by the computer, further causes the computer to perform:
   specifying the first keyword as the target keyword from the plural keywords by analyzing the first keyword area in the first partial image of the first original image data included in the acquired transmission file, and specifying the first keyword as the target keyword from the plural keywords by analyzing the second keyword area in the second partial image of the first original image data included in the acquired transmission file;
   specifying the second keyword as the target keyword from the plural keywords by analyzing the second keyword area in the first partial image of the second original image data included in the acquired transmission file, and specifying the third keyword as the target keyword from the plural keywords by analyzing the third keyword area in the second partial image of the second original image data included in the acquired transmission file;
   in a case where the first keyword in the first partial image of the first original image data is same as the first keyword in the second partial image of the first original image data, generating the first target image data file representing the first target image including plural pages using the first partial image and the second partial image in the first original image data included in the acquired transmission file, the plural pages including a first page representing the first body area and a second page representing the third body area;
   in a case where the second keyword in the first partial image of the second original image data is different from the third keyword in the second partial image of the second original image data, generating the second target image data file using the first partial image in the second original image data included in the acquired transmission file, and generating a third target image data file representing the fourth body area using the second partial image in the second original image data included in the acquired transmission file; and after specifying the third keyword as the target keyword, transmitting the generated third target image data file to the storage server through the network so as to store the generated third target image data file in a third folder which is comprised in the storage server and specified by the third keyword.

8. The non-transitory computer-readable medium according to claim 5, wherein the computer program, when executed by the computer, further causes the computer to perform:

acquiring user identification information;

acquiring the plural keywords based on the acquired user identification information, wherein in a case where the user identification information represents a first user, the acquiring operation acquires a first set of plural keywords associated with the first user, and in a case where the user identification information represents a second user, the acquiring operation acquires a second set of plural keywords associated with the second user;

wherein in a case where the user identification information represents the first user, the template image includes the keyword area including the plural character images representing the first set of plural keywords, respectively, and in a case where the user identification information represents the second user, the template image includes the keyword area including the plural character images representing the second set of plural keywords, respectively.

* * * * *